(12) United States Patent
Kayama et al.

(10) Patent No.: US 7,226,380 B2
(45) Date of Patent: Jun. 5, 2007

(54) AUTOMATIC SPEED CHANGER

(75) Inventors: Kazumichi Kayama, Anjo (JP);
Nobutada Sugiura, Anjo (JP); Shundo Yamaguchi, Anjo (JP); Tatsuya Sugimoto, Anjo (JP); Tomochika Inagaki, Anjo (JP)

(73) Assignee: Aisin AW Co., Ltd., Anjo-shi (JP)

( * ) Notice: Subject to any disclaimer, the term of this patent is extended or adjusted under 35 U.S.C. 154(b) by 213 days.

(21) Appl. No.: 10/519,240

(22) PCT Filed: Dec. 26, 2003

(86) PCT No.: PCT/JP03/17066

§ 371 (c)(1),
(2), (4) Date: Dec. 27, 2004

(87) PCT Pub. No.: WO2004/061330

PCT Pub. Date: Jul. 22, 2004

(65) Prior Publication Data

US 2005/0227804 A1    Oct. 13, 2005

(30) Foreign Application Priority Data

Dec. 27, 2002   (JP) .............................. 2002-379262

(51) Int. Cl.
*F16H 3/62* (2006.01)
(52) U.S. Cl. ..................................................... 475/275
(58) Field of Classification Search ................ 475/269, 475/271, 275, 284, 285, 296, 297, 146, 311–313, 475/323–325; 74/606 R
See application file for complete search history.

(56) References Cited

U.S. PATENT DOCUMENTS 5,133,697 A * 7/1992 Hattori ........................ 475/276
5,342,257 A   8/1994 Hotta et al. .................. 475/275
5,525,117 A * 6/1996 Morisawa et al. ........... 475/281
5,865,289 A * 2/1999 Ishimaru .................... 192/87.11
6,139,463 A   10/2000 Kasuya et al. ............... 475/275

(Continued)

FOREIGN PATENT DOCUMENTS

DE    102 13 820    3/2001

(Continued)

*Primary Examiner*—Charles A Marmor
*Assistant Examiner*—Justin K. Holmes
(74) *Attorney, Agent, or Firm*—Bacon & Thomas, PLLC

(57) ABSTRACT

A second planetary gear unit PR and a clutch C1 for outputting reduced speed rotation are located on one axial side of a first planetary gear unit PU, with an output unit located therebetween. A clutch C2 which connects/disconnects an input shaft 2 to/from a sun gear S2 of the planetary gear unit PU and a clutch C3 connects and disconnects the input shaft to/from a carrier CR2 of the planetary gear unit are on the other axial side of the first planetary gear unit PU. Compared with a transmission wherein a clutch C2 or clutch C3 is located between the second planetary gear unit PR and the planetary gear unit PU, the second planetary gear unit PR and the first planetary gear unit PU can be located closer together, and a member which transmits the reduced speed rotation can be made shorter. Further, compared to the case wherein, for example, the clutches C1, C2, C3 are located together on one axial side, oil supply to their servos is simplified.

16 Claims, 12 Drawing Sheets

U.S. PATENT DOCUMENTS

| | | | |
|---|---|---|---|
| 6,176,802 B1 * | 1/2001 | Kasuya et al. | 475/269 |
| 6,960,150 B2 * | 11/2005 | Armstrong et al. | 475/276 |
| 2002/0142880 A1 | 10/2002 | Hayabuchi et al. | 475/275 |
| 2004/0248684 A1 | 12/2004 | Sugiura et al. | 475/31 |

FOREIGN PATENT DOCUMENTS

| | | |
|---|---|---|
| EP | 1 013 968 | 4/1999 |
| EP | 0 997 663 | 10/1999 |
| JP | 04-125345 | 4/1992 |
| JP | 07-133850 | 5/1995 |
| JP | 2000-274498 | 3/2000 |
| JP | 2000-240740 | 5/2000 |
| JP | 2000-199549 | 7/2000 |
| JP | 2001-082555 | 3/2001 |
| JP | 2002-188694 | 5/2002 |
| JP | 2002-295608 | 9/2002 |

* cited by examiner

ENGAGEMENT TABLE

|  |  | C1 | C2 | C3 | B1 | B2 | F1 |
|---|---|---|---|---|---|---|---|
| P |  |  |  |  |  |  |  |
| R |  |  | ○ |  | ○ |  |  |
| N |  |  |  |  |  |  |  |
| D | FIRST SPEED | ○ |  |  | (○) |  | ○ |
| D | SECOND SPEED | ○ |  |  |  | ○ |  |
| D | THIRD SPEED | ○ | ○ |  |  |  |  |
| D | FOURTH SPEED | ○ |  | ○ |  |  |  |
| D | FIFTH SPEED |  | ○ | ○ |  |  |  |
| D | SIXTH SPEED |  |  | ○ |  | ○ |  |

FIG.2

ENGAGEMENT TABLE

| | | C1 | C2 | C3 | B1 | B2 | F1 |
|---|---|---|---|---|---|---|---|
| P | | | | | | | |
| R | | | ○ | | ○ | | |
| N | | | | | | | |
| D | FIRST SPEED | ○ | | | (○) | | ○ |
| | SECOND SPEED | ○ | | | | ○ | |
| | THIRD SPEED | ○ | ○ | | | | |
| | FOURTH SPEED | ○ | | ○ | | | |
| | FIFTH SPEED | | ○ | ○ | | | |
| | SIXTH SPEED | | | ○ | | ○ | |

FIG.6

ENGAGEMENT TABLE

| | | C2 | C3 | B1 | B2 | B3 | F1 |
|---|---|---|---|---|---|---|---|
| | P | | | | | | |
| | R | ○ | | ○ | | | |
| | N | | | | | | |
| D | FIRST SPEED | | | (○) | | ○ | ○ |
| | SECOND SPEED | | | | ○ | ○ | |
| | THIRD SPEED | ○ | | | | ○ | |
| | FOURTH SPEED | | ○ | | | ○ | |
| | FIFTH SPEED | ○ | ○ | | | | |
| | SIXTH SPEED | | ○ | | ○ | | |

FIG. 11

AUTOMATIC SPEED CHANGER

CROSS-REFERENCE TO RELATED APPLICATIONS

This application is a National Phase Application (35 USC 371) of PCT/JP2003/017066 and claims priority of Japanese Application No. 2002-279860 filed Sep. 25, 2002.

TECHNICAL FIELD

The present invention relates to an automatic transmission mounted on a vehicle, and more specifically, it relates to the design of an automatic transmission wherein multiple speed levels are established by input of reduced speed rotation into one of the rotatable components of a planetary gear unit.

BACKGROUND ART

Generally, a vehicular automatic transmission comprises two linked planetary gear units, and planetary gearing for reducing speed of the rotation received from the input shaft (for example, see Japanese Unexamined Patent Application Publication No. 4-125345). Such a transmission achieves, for example, six forward speeds and one reverse speed, by input of reduced speed rotation from the planetary gearing via a clutch to, for example, one rotary component of a planetary gear unit that has four rotary components. Further, in the case of fifth speed forward, for example, when the rotation of the input shaft is simultaneously input into two of the rotary components of the planetary gear unit by engaging two clutches, this fifth speed forward is a directly coupled state, with rotation similar to that of the input shaft (see Japanese Unexamined Patent Application Publication No. 2000-274498, for example).

The above-described automatic transmission comprises two clutches for input of the rotation of the input shaft into two of the rotary components of the aforementioned planetary gear unit, and planetary gearing for reducing the speed rotation input into the rotary components of the planetary gear unit. However, if those two clutches or the oil servos that control the engagement of those clutches are located between the planetary gear unit and the speed-reduction planetary gearing, the element(s) for transmitting the reduced speed rotation of this speed-reduction planetary gearing to the rotary components of the planetary gear must be axially lengthened.

The axial lengthening of the element(s) that transmits the reduced speed rotation means that the unit transmitting a large torque is elongated, and an elongated unit that can withstand the large torque requires elongation of a relatively thick material, preventing a compact automatic transmission. Further, the weight of such a unit would be heavier, and not only would a lightweight automatic transmission become impossible, but inertia (inertial force) would increase, thereby reducing the controllability of the automatic transmission and speed change shocks would become more likely to occur.

In order to engage or disengage the reduced speed rotation output to the planetary gear unit from the speed reduction planetary gearing, a clutch or brake must be provided. When a clutch is provided, this clutch and the above-mentioned two clutches, in other words three clutches, are necessary. In general, a clutch has a drum-shaped member (clutch drum) that transmits the input rotation to the friction plates, and therefore, for example with a problem such as relative rotation, supply of oil pressure to the oil compartment of the hydraulic servo of the clutch must come from the mid-section of the automatic transmission.

However, if the required three clutches are located on one axial side of the planetary gear unit, oil lines for supplying oil pressure to three hydraulic servos are provided in triplicate in the mid-section of the automatic transmission, and the configuration of the oil lines becomes complicated.

SUMMARY OF THE INVENTION

Accordingly, the object of the present invention is to provide an automatic transmission wherein a reduced speed rotation output means is located on one axial side of the planetary gear unit, and a first clutch and a second clutch are located on the other axial side of the planetary gear unit, and hence to solve the problems mentioned above.

In one aspect, the present invention is an automatic transmission comprising: an input shaft that rotates based on output of a drive source; a planetary gear unit comprised of first, second, third, and fourth rotary components; reduced speed rotation output means for reducing the speed of rotation of the input shaft and for output of a reduced speed rotation to the first rotary component; a first clutch for selectively engaging/disengaging the input shaft to/from the second rotary component; a second clutch for selectively engaging/disengaging the input shaft to/from the third rotary component; and an output unit for outputting the rotation of the fourth rotary component to the drive wheels; wherein at least five forward speeds and one reverse speed are achieved, and wherein a directly coupled state can be achieved wherein the rotation of the input shaft is output without change in speed by engagement of the first clutch and the second clutch while in fifth speed forward or higher; and wherein the reduced speed rotation output means is located on one axial side of the planetary gear unit, and an output member is located between the planetary gear unit and the reduced speed rotation output means; and wherein the first clutch and the second clutch are located on the other axial side of the planetary gear unit.

Accordingly, while providing an automatic transmission which is directly coupled in fifth speed forward, which provides at least five forward speeds and one reverse speed, the reduced speed rotation output means and the planetary gear unit can be located closer together, as compared to the case wherein a clutch is located between the reduced speed rotation output means and the planetary gear unit for example, and the transmitting element(s) for transmitting the reduced speed rotation can be made relatively short. Therefore, the automatic transmission can be made compact and lightweight, and further, because the inertia (inertial force) can be reduced, the controllability of the automatic transmission can be improved, and the occurrence of speed change shock can be reduced. Further, in the case that, for example, the reduced speed rotation output means has a clutch, three clutches are required, but compared to the case wherein three clutches are located on one side of the planetary gear unit, the construction of the oil lines which supply oil pressure to the hydraulic servos for these clutches is simplified, the manufacturing process is simplified and the manufacturing costs are reduced.

Further, because the output unit is located axially intermediate the planetary gear unit and the reduced speed rotation output means, the output unit can be located in approximately the axial center of the automatic transmission. For example, when the automatic transmission is mounted on a vehicle, enlargement toward the rear (when the input side for receiving power from the drive source is the front) becomes unnecessary because the output unit is mounted to mate with the drive wheel transmission mechanism. Because of this, particularly in the case of a FF vehicle, interference with the front wheels is reduced, and the mountability on a vehicle is improved. For example, the steering angle is greatly improved.

The reduced speed rotation output means preferably includes a speed reducing planetary gear unit that has a reduced speed rotary component that rotates at the reduced speed rotation and a third engaging component for controlling the rotation of a component of the speed reducing planetary gear unit. Preferably, the third engaging component engages in the first speed forward.

The speed reducing planetary gear unit preferably includes an input rotary component that continuously receives as input the rotation of the input shaft, a reduced speed rotary component that rotates at a reduced speed and a third component that is fixed for speed reduction, whereby the reduced speed rotary component rotates at a speed based on the rotation of the input rotary component and fixation of third component; and the third engaging component is a third clutch for engaging/disengaging the reduced speed rotary component to/from the first rotary component.

In some of the preferred embodiments the third component is a non-rotatable carrier fixed to the transmission case through an end plate and in other preferred embodiments is a rotatable carrier which is fixed against rotation by engagement by a brake.

Accordingly, because the reduced speed rotation output means includes a third clutch, three clutches in total are required, but because the speed reducing second planetary gear unit is located on one axial side of the first planetary gear unit, and the first clutch and the second clutch are located on the other axial side, compared to a design wherein these three clutches are located on one side of the first planetary gear unit, the construction of an oil line to provide oil to the hydraulic servos for these clutches is simplified, the manufacturing process is simplified and the manufacturing costs are reduced.

The third clutch is preferably located on the side of the first planetary gear unit axially opposite the speed reducing (second) planetary gear unit; and the third clutch comprises a third hydraulic servo that engages friction members, a drum unit that is constructed integrally with the third hydraulic servo and opens toward the speed reducing planetary gear unit, and a hub unit; wherein the third hydraulic servo is disposed on a boss extending from the case, and oil is supplied to the hydraulic servo from an oil path in the boss.

In another embodiment the speed reducing second planetary gear unit includes the input rotary component that receives as input the rotation of the input shaft, a third component fixed against rotation, and a reduced speed rotary component that rotates at a reduced speed based on the rotation of the input rotary component and the fixed carrier; wherein the third engaging component is a third clutch that engages/disengages the input shaft to/from the input rotary component.

Accordingly, in the latter-described embodiment also, because the speed reducing second planetary unit comprises the third clutch, three clutches are required, but here too the speed reducing second planetary gear unit is located on the side of the first planetary gear unit opposite the first and second clutches.

Further, because engagement of the third clutch connects the input shaft and the input rotary component, the load on the third clutch can be reduced, and the third clutch can be made more compact, as compared with the case wherein the third clutch connects the input rotary component and the first rotary component.

The third clutch comprises a hydraulic servo that engages friction members, a drum unit that is constructed integrally with the hydraulic servo, and a hub unit; and wherein the hub unit is linked with the input rotary component; and wherein the drum unit is linked to the input shaft, and is positioned so as to open toward the speed reducing second planetary gear unit.

Also, the input rotary component which rotates at a high speed in sixth speed forward can be linked to the hub unit which has a smaller diameter than the drum unit and, as compared to the case wherein it is linked to the drum unit, the centrifugal force is reduced, and controllability of operation of the third clutch is improved.

The hydraulic servo of the third clutch may be mounted on the input shaft, whereby it can receive supply of oil via an oil path within the input shaft. Alternatively, the hydraulic servo of the third clutch may be mounted on a boss extending from the case, whereby it can receive supply of oil via an oil path within the boss.

In another embodiment the speed reducing second planetary gear unit comprises an input rotary component that receives as input the rotation of the input shaft, a reduced speed rotary component and a rotatable third component, whereby said reduced speed rotary component rotates at a reduced speed based on the rotation of the input rotary component with the rotatable third component fixed against rotation, and wherein the third engaging component is a third brake for fixing the rotatable third component against rotation.

The third brake may be located on the axial side of the first planetary gear unit opposite the speed reducing planetary gear unit; and the hydraulic servo of the third brake may be formed in the end wall of the case.

In another preferred embodiment the first clutch engages in first speed reverse. Accordingly, when in reverse, with the first clutch engaged, one unit (particularly the transmitting member) rotates in reverse at reduced speed from the reduced speed rotation output means, while the unit connecting the first clutch and the second rotary component rotates at the speed of the input shaft, in some cases the difference between these speeds may be large. However, because the first clutch is located on the side of the first planetary gear unit opposite the reduced speed rotation output means, the unit with reverse rotation (particularly the transmitting member) and the unit rotating at the speed of the input shaft can be spaced apart, and compared with the case wherein for example those units are in contact in a multi-axial construction, a decrease in efficiency of the automatic transmission resulting from the relative rotation between these units can be prevented.

In another preferred arrangement, the first clutch adjoins the first planetary gear unit and comprises friction members, a hydraulic servo that causes the friction members to engage, and a drum unit and a hub unit that are constructed integral with the hydraulic servo. In this preferred configuration the drum unit is linked with the input shaft, and the hub unit is linked with the second rotary component. Further, the second clutch is on the side of the speed reducing second planetary gear unit axially opposite the first clutch. Here, the second clutch also comprises friction members and a hydraulic servo that causes the friction members to engage, and a drum unit and a hub unit that are integral with this hydraulic servo. In such an embodiment the drum unit of the second clutch is linked with the input shaft, and the hub unit is linked with the third rotary component, radially inward of the first clutch.

The present invention may further include a first brake capable of fixing the second rotary component against rotation, and a second brake for braking the third rotary component, with the first brake located radially outward of the first clutch and the second brake located radially outward of the first planetary gear unit.

The first brake includes friction members and a hydraulic servo that causes engagement of the friction members. The hydraulic servo of the first brake is preferably located radially outward of the hydraulic servo of the first clutch, at a position at least partially axially overlapping same. The friction members of the first brake include plates splined to the case and, intermeshed therewith, friction members splined to the hub unit of the first clutch.

Likewise, the second brake includes friction members and a hydraulic servo that controls engagement/disengagement of the friction members. The hydraulic servo of the second brake is preferably formed in a portion of the case, extending radially inward as a transverse wall which rotatably supports the output member, and the friction members of the second brake are preferably located radially outward of the first planetary gear unit.

A transmitting member links the reduced speed rotary element of the second planetary gear unit or the third engaging component and the first rotary element of the first planetary gear, said transmitting member including an axially extending portion radially inward of the output unit.

The automatic transmission of the present invention may further include a differential unit for outputting rotation to the drive wheels, and a counter shaft unit for engaging the differential unit, wherein the output member is a counter gear meshing with the counter shaft unit.

In a preferred embodiment, the first planetary gear unit is a multiple type planetary gear unit, comprising a first sun gear, a long pinion which meshes with the first sun gear, a short pinion which meshes with the long pinion, a carrier for rotationally supporting the long pinion and the short pinion, a second sun gear meshing with the short pinion, and a ring gear meshing with the long pinion. In this preferred embodiment, the first rotary component is the second sun gear which receives the reduced speed rotation of the reduced speed rotation output means, the second rotary component is the first sun gear which is rotatably driven by the input shaft with the first clutch engaged, and which is fixed against rotation by engagement of the first brake, the third rotary is a carrier which receives input of rotation from the input shaft upon engagement of the second clutch, and which is fixed against rotation by engagement of a second brake, and the fourth rotary component is a ring gear linked to the output member.

In the preferred embodiment described immediately above, in first speed forward, reduced speed rotation is input to the first rotary component from the reduced speed rotation output means, and the second brake is engaged. In second speed forward, reduced speed rotation is input to the first rotary component from the reduced speed rotation output means, and the first brake is engaged. In third speed forward, reduced speed rotation is input to the first rotary component from the reduced speed rotation output means, and the first clutch is engaged. In fourth speed forward, reduced speed rotation is input to the first rotary component from the reduced speed rotation output means, and the second clutch is engaged. In fifth speed forward, the first clutch and the second clutch are both engaged and in sixth speed forward, the second clutch and first brake are engaged. In first speed reverse, the first clutch and second brake are engaged. Thus, in the foregoing preferred embodiment six forward speeds and one reverse speed are provided.

BRIEF DESCRIPTION OF THE DRAWINGS

FIG. 2 is a table of operations for the automatic transmission of the first embodiment;

FIG. 6 is a table of operations of an automatic transmission according to the third embodiment;

FIG. 11 is a table of operations for an automatic transmission according to the sixth embodiment.

DESCRIPTION OF THE PREFERRED EMBODIMENTS

First Embodiment

Figure 3:
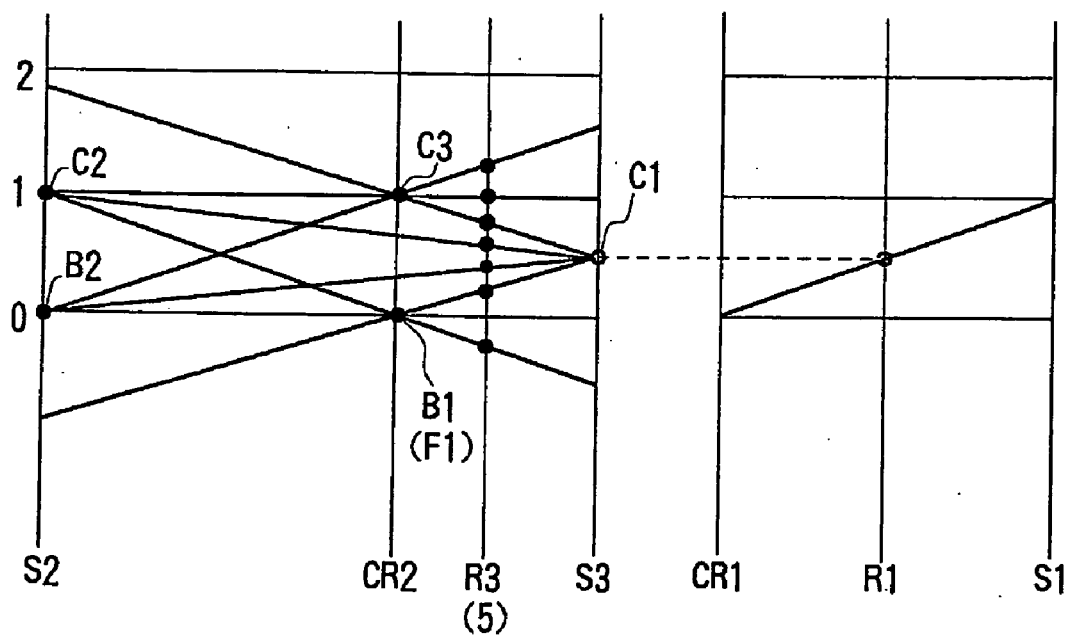
FIG. 3 is a speed line diagram for the automatic transmission of the first embodiment.

A first embodiment of the present invention will be described with reference to FIG. 1 through FIG. 3.

Figure 1:
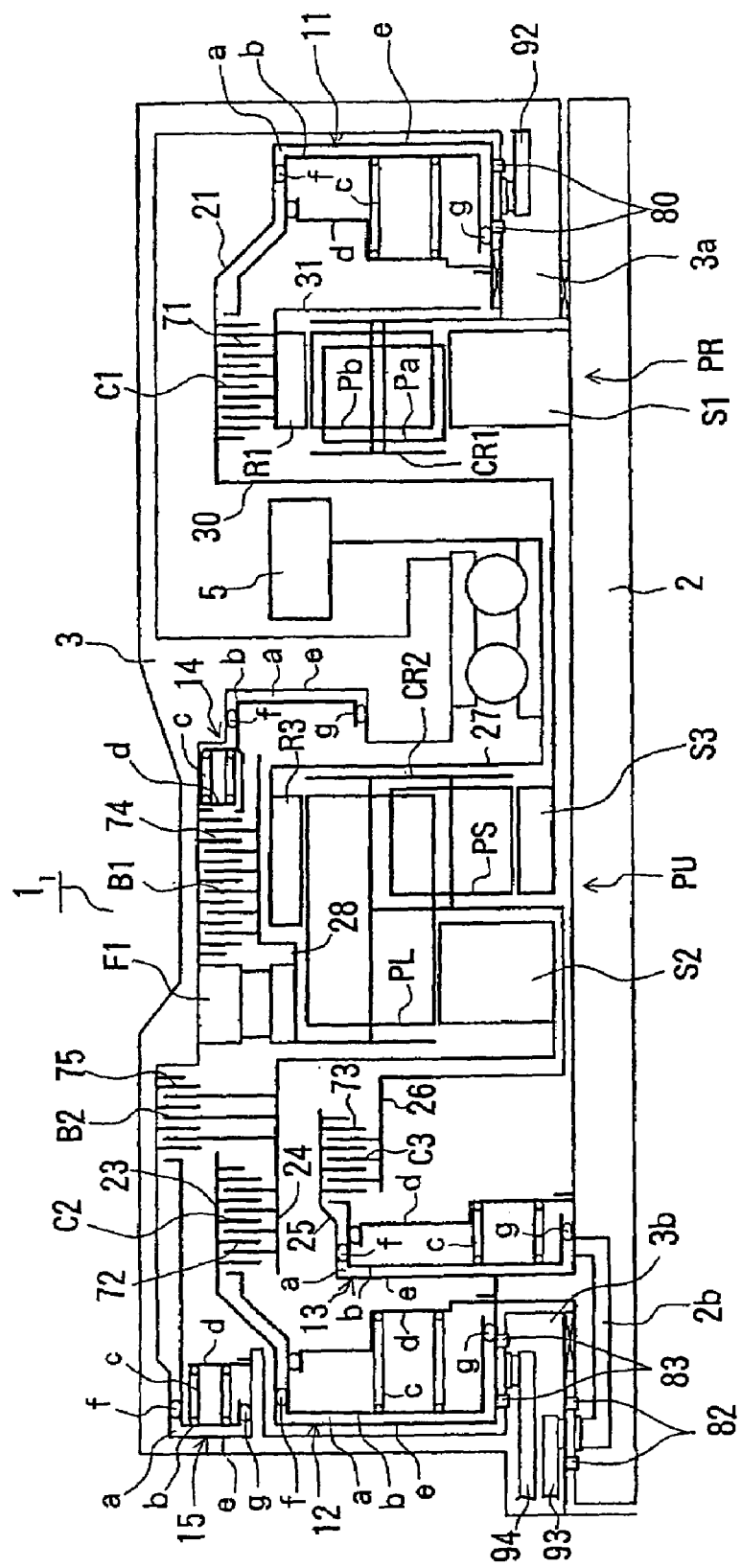
FIG. 1 is a schematic cross-sectional view of an automatic transmission according to a first embodiment of the present invention.

The automatic transmission $1_1$ of the first embodiment of the present invention, as illustrated in FIG. 1, is particularly useful for a FF (front engine, front wheel drive) vehicle, and has a case comprising a housing for a torque converter, not illustrated, and a transmission case 3 housing automatic transmission $1_1$, a counter shaft unit (drive wheel transmission mechanism), not illustrated, and a differential unit (drive wheel transmission mechanism).

The torque converter is located on an axis centered on an input shaft 2 of the automatic transmission device $1_1$, which is on the same axis as the output shaft of the engine (not illustrated). Further, the counter shaft unit includes a counter shaft (not illustrated) on an axis that is parallel to the input shaft 2, and the above-mentioned differential unit has a lateral axle, not illustrated, on an axis that is parallel to the counter shaft.

As illustrated in FIG. 1, the automatic transmission $1_1$ comprises a first planetary gear unit PU and a second planetary gear unit (speed reducing planetary gear unit) PR on the input shaft 2. The first planetary gear unit PU is a multiple-type planetary gear unit, which has a sun gear S2 (the second rotary component), a carrier CR2 (the third rotary component), a ring gear R3 (the fourth rotary component), and a sun gear S3 (the first rotary component), as the four rotary components. The carrier CR2 has a long pinion PL that meshes with a sun gear S2 and the ring gear R3, and a short pinion PS that meshes with the sun gear S3, and the pinions PL and PS are meshed with one another. Further, the second planetary gear unit PR is a double pinion planetary gear unit that has a carrier CR1, wherein a pinion Pb is meshed with a ring gear R1 and a pinion Pa is meshed with a sun gear S1, and the pinions Pa and Pb are meshed one to another.

A boss 3a extends from one edge of the case 3 and forms a sleeve surrounding one end of input shaft 2, and on this boss 3a is mounted a multi-disc clutch C1 ("reduced speed rotation output means", the "third engaging component", the "third clutch") comprising a hydraulic servo 11, friction plates 71, and a clutch drum 21.

Hydraulic servo 11 includes a piston unit b for pressing against the friction plates 71, the clutch drum 21 that has a cylinder unit e, an oil chamber "a" which is formed as a sealed area between the piston unit b and the cylinder unit e with seal rings f and g. A return spring c biasing the piston unit b towards oil chamber "a", and a return plate d that supports one end of return spring c.

Each hydraulic servo is constructed similarly with an oil chamber "a", a piston unit b, a return spring c, a return plate d, a cylinder unit e, and seal rings f and g, and as such, description thereof will not be repeated.

The oil chamber "a" of hydraulic servo 11 is in communication with an oil line 92 in the boss 3a, and this oil line 92 is linked to an oil pressure control device not illustrated. Because the hydraulic servo 11 is located on the boss 3a, an oil connection from the oil pressure control unit (not illustrated) to the oil chamber "a" of the hydraulic servo 11 can be formed by one set of seal rings 80 which form a seal between the boss 3a and the clutch drum 21.

The boss 3a rotatably supports the clutch drum 21. Friction plates 71 are splined to the inner circumferential surface of a front section of the clutch drum 21 and are engaged/disengaged by hydraulic servo 11 for the clutch C1. Further, the friction plates 71 of clutch C1 are intermeshed with friction plates splined to the outer surface of the ring gear R1 which forms part of the hub unit 31 which is rotatably supported by the boss 3a. The carrier CR1 has pinion Pb which meshes with the ring gear R1, and the pinion Pa which meshes with the sun gear S1 which, in turn, is connected to the input shaft 2. This carrier CR1 is secured to the boss 3a of the case 3 via a side plate, and the sun gear S1 is connected to the input shaft 2.

The clutch drum 21 is connected to one end of a transmitting member (the reduced speed rotation output means) 30, that transmits the rotation of the ring gear R1 when clutch C1 is engaged, and the other end of the transmitting member 30 is connected to the sun gear S3 of the above-mentioned first planetary gear unit PU.

At the other end of the input shaft 2 (left side of diagram) is located a multi-disc clutch C3 (the second clutch) which includes a hydraulic servo 13, friction plates 73, a clutch drum member 25, and a hub unit 26. Further, boss 3b extends axially from the left (in FIG. 1) end of the case 3, forms a sleeve around the input shaft 2 and supports a multi-disc clutch C2 (the first clutch) including a hydraulic servo 12, friction plates 72, a clutch drum 23 and a hub unit 24. Further, radially outward of clutch C2 is located a multi-disc brake B2 comprising a hydraulic servo 15 and friction plates 75, such that at least a part thereof axially overlaps the hydraulic servo 12.

The oil chamber "a" of hydraulic servo 13 connects an oil line 2b formed on input shaft 2, and this oil line 2b connects with an oil line 93 in the boss 3b, and line 93, in turn, is linked to an oil pressure control device, not illustrated. In other words, the connection between the oil chamber "a" of hydraulic servo 13 and the oil pressure control device, not illustrated, is formed by one set of seal rings 82 that provide a seal between the boss 3b of the case 3 and the input shaft 2.

The oil chamber "a" of the above-mentioned hydraulic servo 12 connects to an oil line 94 of the boss 3b, and this oil line 94 connects with the oil pressure control device, not illustrated. In other words, the connection between the oil chamber "a" of hydraulic servo 12 and the oil pressure control device, not illustrated, is formed by one set of seal rings 83 that provide a seal between the boss 3b of the case 3 and an extension of the clutch drum member 23.

The clutch drum 25 of the clutch C3 is connected to the input shaft 2 and, splined to a front portion of the inner circumferential surface of clutch drum 25, are friction plates 73 that are engaged/disengaged by hydraulic servo 13. The inner friction plates 73 of clutch C3 are intermeshed with friction plates splined to a hub unit 26, and this hub unit 26 is connected to the carrier CR2.

The clutch drum 23 of the clutch C2 is connected to the input shaft 2, and the inner circumferential surface of clutch drum 23 has friction plates 72 splined thereto which are engaged/disengaged by the hydraulic servo 12. The friction plates 72 of clutch C2 are intermeshed with friction plates splined to a hub unit 24. Friction plates 75 of the brake B2 are intermeshed with friction plates splined to the outer circumferential surface of hub unit 24 and are engaged/disengaged by hydraulic servo 15 for the brake B2. This hub unit 24 is also connected to the sun gear S2.

On the radially outer side of the first planetary gear unit PU is a multi-disc brake B1 (second brake) that comprises a hydraulic servo 14, friction plates 74, and a hub unit 28. The hydraulic servo 14 is formed in a member extending radially inward from the case 3 and rotatably supporting a counter gear 5. Also, a side plate of the carrier CR2 of the first planetary gear unit PU is connected to hub unit 28 to which are splined the friction plates 74 meshing with friction plates of the above-mentioned brake B1. Further, hub unit 28 is connected to the inner race of a one-way clutch F1. The sun gear S3 is meshed with the short pinion PS of this carrier CR2, and the above-mentioned sun gear S2 and ring gear R3 are meshed with the long pinion PL of this carrier CR2. Also, a linking member 27 is connected to one end of ring gear R3, and thereby links ring gear R3 to the counter gear (output unit) 5.

As described above, the second planetary gear unit PR and the clutch C1 are located at one axial side of the first planetary gear unit PU, whereas the clutch C2 and the clutch C3 are located on the other axial side. Further, the counter gear 5 is located axially between the second planetary gear unit PR and the first planetary gear unit PU. Further, the first brake B2 is located radially outward of the clutch C2, and the second brake B1 is located radially outward of the first planetary gear unit PU.

Operation of the automatic transmission $1_1$ will now be described, with reference to FIG. 1, FIG. 2, and FIG. 3. The vertical axes of the speed line diagram illustrated in FIG. 3 show the speed of rotation of each rotary component, and the horizontal axis indicates the corresponding gear ratio of these rotary components. Further, in the first planetary gear unit PU section of this speed line diagram, the vertical axes at the right side of FIG. 3 correspond to the sun gear S3, and moving to the left within the diagram, the vertical axes correspond, successively, to the ring gear R3, the carrier CR2, and the sun gear S2. In the second planetary gear unit PR section of this speed line diagram (right section in FIG. 3), the vertical axis to the farthest right side of FIG. 3 corresponds to the sun gear S1, and, moving to the left within the diagram, the vertical axes correspond to, successively, the ring gear R1 and the carrier CR1. Further, the widths between these vertical axes are inversely proportional to the number of teeth of each of the sun gears S1, S2, S3, and to the number of teeth of each of the ring gears R1, R3. The horizontal dotted line within the diagram represents the rotation transmitted from the transmitting member 30.

As illustrated in FIG. 1, the rotation of the input shaft 2 is input to the sun gear S2, by engaging the clutch C2, and the rotation of this sun gear S2 can be stopped (braked) by engagement of the brake B2 ("first brake"). The rotation of the input shaft 2 is input to the carrier CR2 by engaging the clutch C3, and this carrier CR2 can be held against rotation by engagement of the brake B2, and further, the rotation is limited to one direction by a one-way clutch F3.

The above-mentioned sun gear S1 is connected to and receives input of rotation from the input shaft 2. The carrier CR1 is fixed to the case 3 and, therefore, the ring gear R1 rotates at a reduced speed. Further, by engaging the clutch C1, the reduced speed rotation of this ring gear R1 is input to the sun gear S3. The rotation of the ring gear R3 is output to the counter gear 5, and from the counter gear 5 to the drive wheels, not illustrated, via this counter gear 5, a counter shaft unit not illustrated, and a differential unit.

In first speed forward within D (drive) range, as illustrated in FIG. 2, the clutch C1 and the one-way clutch F1 are engaged. Then, as illustrated in FIG. 3, the reduced speed rotation of the ring gear R1 is input to the sun gear S3 via the clutch C1 and the transmitting member 30. Further, the rotation of the carrier CR2 is limited to one direction (the forward rotation direction) by the one-way clutch F1. The ring gear R3 rotates in the forward rotation for first speed forward, with the reduced speed rotation input to the sun gear S3 and the fixed carrier CR2, and that rotation is output from the counter gear 5.

For downshifting (when coasting), the brake B1 is engaged to fix the carrier CR2, and the first speed forward is maintained while preventing forward rotation of this carrier CR2. Further, in first speed forward, the one-way clutch F1 prevents the carrier CR2 from rotation in the reverse direction while allowing forward rotation, and therefore, switching from a non-running range to a running range and achieving the first speed forward can be accomplished more smoothly by the automatic engaging of the one-way clutch. In this case, because the sun gear S3 and the ring gear R1 are rotating at a reduced speed, the above-mentioned transmitting member 30 transmits a relatively large torque.

In second speed forward within the D (drive) range, as illustrated in FIG. 2, the clutch C1 and the brake B2 are engaged. Then, as illustrated in FIG. 3, the reduced speed rotation of the ring gear R1 is input to the sun gear S3 via the clutch C1 and the transmitting member 30, and the rotation of the sun gear S2 is stopped by the brake B2. By doing so, the carrier CR2 rotates at a slightly reduced speed, and from the reduced speed rotation input to the sun gear S3 and this slightly reduced speed rotation of the carrier CR2, the ring gear R3 is rotated with the forward rotation for the second speed forward, and this rotation is output to the counter gear 5. Because the sun gear S3 and the ring gear R1 are rotating at a reduced speed, the above-mentioned transmitting member 30 transmits a relatively large torque.

In third speed forward within the D (drive) range, as illustrated in FIG. 2, the clutch C1 and the clutch C2 are engaged. Then, as illustrated in FIG. 3, the reduced speed rotation of the ring gear R1 is input to the sun gear S3 via the clutch C1 and the transmitting member 30, and also the rotation of the input shaft 2 is input to the sun gear S2 by engaging the clutch C2. Further, by the rotation of the input shaft 2 input to the sun gear S2 and by the decreased speed rotation of the sun gear S3, the speed of rotation of carrier CR2 is reduced to a slightly larger extent than the reduction in rotational speed of this sun gear S3. Further, from the input rotation of the sun gear S2 and the reduced speed rotation of the sun gear S3, the ring gear R3 is rotated with the forward rotation of third speed forward, and this rotation is output from the counter gear 5. In this case also, because the sun gear S3 and the ring gear R1 are rotating at a reduced speed, the above-mentioned transmitting member 30 transmits a relatively large torque.

In fourth speed forward within the D (drive) range, as illustrated in FIG. 2, the clutch C1 and the clutch C3 are engaged. Then, as illustrated in FIG. 3, the reduced speed rotation of the ring gear R1 is input to the sun gear S3 via the clutch C1 and the transmitting member 30, and also the rotation of the input shaft 2 is input to the carrier CR2 via the clutch C3. Then, by the rotation of input shaft 2 input to the carrier CR2 and by the reduced speed rotation of the sun gear S3, the ring gear R3 is rotated with the forward rotation of fourth speed forward, and this rotation is output from the counter gear 5. In this case also, because the sun gear S3 and the ring gear R1 are rotating at a reduced speed, the transmitting member 30 transmits a relatively large torque.

In fifth speed forward within the D (drive) range, as illustrated in FIG. 2, the clutch C2 and the clutch C3 are engaged. Then, as illustrated in FIG. 3, the rotation of input shaft 2 is input to the carrier CR2 via the clutch C3, and also the rotation of the input shaft 2 is input to the sun gear S2 via the clutch C2. Then, from the rotation of the input shaft 2 input to the sun gear S2, and the rotation of the input shaft 2 input to the carrier CR2, the ring gear R3 becomes directly connected and rotates with the forward rotation of fifth speed forward which is at the same speed as that of the input shaft 2, and this rotation is output from the counter gear 5.

In sixth speed forward within the D (drive) range, as illustrated in FIG. 2, the clutch C3 and the brake B2 are engaged. Then, as illustrated in FIG. 3, the rotation of the input shaft 2 is input to the carrier CR2 via the clutch C3, and rotation of the sun gear S2 is fixed by engagement of the brake B2. Then, from the rotation of the input shaft 2 input to the carrier CR2 with the sun gear S2 fixed, the ring gear R3 rotates with the overdrive rotation of sixth speed forward, and this rotation is output from the counter gear 5.

In first speed reverse within R (reverse) range, as illustrated in FIG. 2, the clutch C2 and the brake B1 are engaged. Then, as illustrated in FIG. 3, the rotation of the input shaft 2 is input to the sun gear S2 by engaging the clutch C2, and also the rotation of the carrier CR2 is fixed by engagement of the brake B1. Then, from the rotation of the input shaft 2 input to the sun gear S2 and the fixing of the carrier CR2, the ring gear R3 rotates in the opposite direction, i.e., as first speed reverse, and this rotation is output from the counter gear 5.

In the P (parking) range and the N (neutral) range, the clutch C1, clutch C2, and clutch C3 are released, the transmission of rotation between the input shaft 2 and the counter gear 5 is disconnected, and the automatic transmission $1_1$ as a whole is in an idle state (neutral state).

As described above, in the automatic transmission $1_1$ of the present invention, the second planetary gear unit PR and the clutch C1 are located on one axial side of the first planetary gear unit PU, and the clutches C2 and C3 are located on the other axial side of the first planetary gear unit PU. Therefore, an automatic transmission is provided that will achieve six forward speeds and one reverse speed with direct coupling in fifth speed forward. For example, compared to the case wherein the clutch C2 or clutch C3 is located between the second planetary gear unit PR and the first planetary gear unit PU, the second planetary gear unit PR and the first planetary gear unit PU can be located closer together, and the transmitting member 30 which transmits the reduced speed rotation can be made relatively short. Therefore, the automatic transmission can be made more compact and lightweight, and further, because the inertia (inertial force) can be reduced, the controllability of the automatic transmission can be improved, and the occurrence of speed change shock can be reduced.

Further, the clutch C1 is located on one axial side of the first planetary gear unit PU, and the clutches C2 and C3 are located on the other axial side of the first planetary gear unit PU, and therefore, compared to the case wherein three clutches C1, C2, C3 are located on one axial side of the first planetary gear unit PU, the construction of an oil line (for example, 2b, 92, 93, 94) for providing oil pressure to the hydraulic servos 11, 12, and 13 for these clutches C1, C2, and C3 can be easily made, the manufacturing process can be simplified, and the costs brought down.

Further, because the hydraulic servo 13 is mounted on the input shaft 2, one set of seal rings 82 form a seal between the case 3 and the oil line 2b provided within the input shaft 2, and therefore oil can be supplied to the oil chamber "a" of the hydraulic servo 13 without providing additional seal rings between, for example, the input shaft 2 and the hydraulic servo 13. Further, the hydraulic servos 11 and 12 can each receive supply of oil directly from the bosses 3a and 3b, i.e., without passing through other units. In other words, oil can be supplied simply by providing one set of seal rings 82, 80, and 83 each for the hydraulic servos 11, 12, and 13, sliding resistance from the seal rings can be minimized, and therefore, the efficiency of the automatic transmission can be improved.

Further, since clutch C2 is engaged in first speed reverse, the transmitting member 30 rotates in reverse, and while the hub unit 24 that connects this clutch C2 and the sun gear S2 has the same rotational speed as the input shaft 2, there may be cases wherein the difference of rotational speeds between transmitting member 30 and the hub unit 24 becomes large, but because clutch C2 is located on the side of the first planetary gear unit PU opposite the second planetary gear unit PR, the transmitting member 30 and the hub unit 24 can be located apart from one another. Compared to the case wherein, for example, those parts come in contact due to a multi-axial construction, the loss of efficiency of the automatic transmission caused by the friction produced by the relative rotation between those parts can be prevented.

Further, because the counter gear 5 is located axially between the first planetary gear unit PU and the second planetary gear unit PR, the counter gear 5 can be located in approximately the axial center of the automatic transmission. For example, when the automatic transmission is mounted on a vehicle, enlargement toward the rear (when the input side from the drive source is the front direction) can be prevented because the counter gear 5 is mounted to mate with the drive wheel transmission mechanism. Because of this, particularly in the case of a FF vehicle, the interference with the front wheels is reduced, and the mountability on a vehicle can be improved. The steering angle is greatly improved, for example.

Because the automatic transmission of the present embodiment is directly coupled in fifth speed forward, in first speed forward or fourth speed forward, the gear ratio can be more precisely set for efficiency, and particularly when the vehicle is running at a high speed, the engine can be operated at a lower speed, and this contributes to increased fuel economy of the vehicle while running at a low to medium speed.

Second Embodiment

The second embodiment, which is a partial modification of the first embodiment, will be described with reference to FIG. 4. Components of the second embodiment which are the same as those of the first embodiment are denoted by the same reference numerals, and description thereof omitted, except for those components which are modified.

Figure 4:
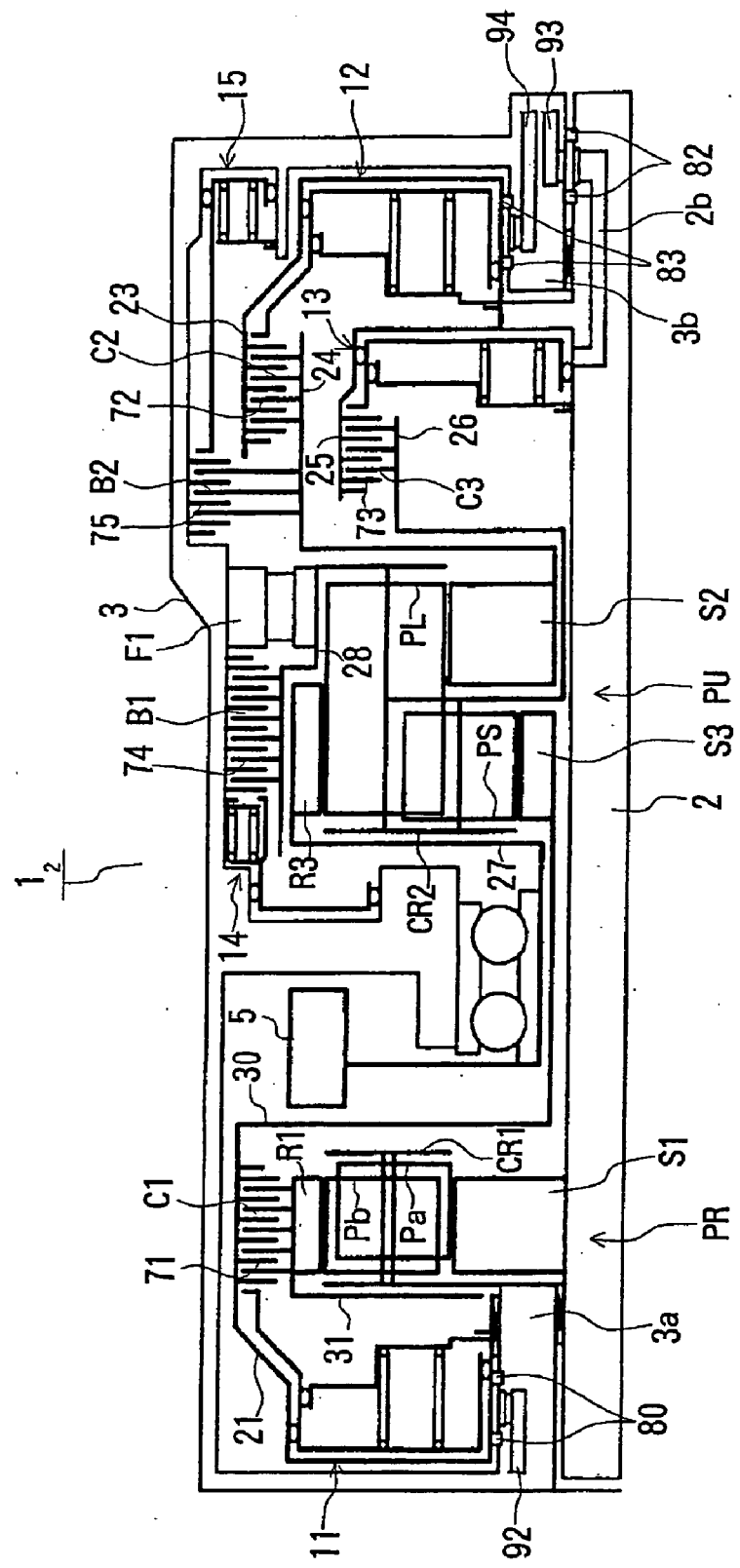
FIG. 4 is a schematic cross-sectional view of an automatic transmission according to a second embodiment of the present invention.

As FIG. 4 illustrates, the automatic transmission $1_2$ of the second embodiment has the input side and output side reversed from that of the automatic transmission $1_1$ of the first embodiment (see FIG. 1). Further, the operations of first speed forward through the sixth speed forward and the first speed reverse are similar (see FIG. 2 and FIG. 3).

Accordingly, similar to the first embodiment, in the automatic transmission $1_2$ of the second embodiment, the second planetary gear unit PR and the clutch C1 are located on one axial side of the first planetary gear unit PU, and the clutch C2 and the clutch C3 are located on the other axial side of the first planetary gear unit PU, and therefore directly coupled when at fifth speed forward, and can achieve six forward speeds and one reverse speed. In this second embodiment also, the second planetary gear unit PR and the first planetary gear unit PU can be located closer together, compared to the case wherein, for example, the clutch C2 and the clutch C3 are located between the second planetary gear unit PR and the planetary gear unit PU, and the transmitting member 30 which transmits the reduced speed rotation can be made relatively short. Therefore, the automatic transmission can be made compact and lightweight, and further, because the inertia (inertial force) can be reduced, the controllability of the automatic transmission can be improved, and the occurrence of speed change shock can be reduced.

Further, the clutch C1 is located on one axial side of the planetary gear unit PU, and the clutch C2 and the clutch C3 are located on the other axial side of the first planetary gear unit PU, and therefore, compared to the case wherein, for example, the three clutches C1, C2, and C3 are located on one side of the first planetary gear unit PU, the oil line (for example, 2b, 92, 93, 94) for providing oil to the hydraulic servos 11, 12, and 13 for operating these clutches C1, C2, and C3 can be easily constructed, i.e., the manufacturing process is simplified and the costs reduced.

Further, because the hydraulic servo 13 is provided on the input shaft 2, one set of the seal rings 82 form an oil supply connection of oil line 93 in boss 3b to the oil line 2b provided within input shaft 2, and therefore oil can be supplied to the oil chamber "a" of the hydraulic servo 13 without providing seal rings between, for example, the input shaft 2 and the hydraulic servo 13. Further, the hydraulic servos 11 and 12 can each receive supply of oil directly from the boss units 3a and 3b provided from the case 3, i.e., without passing through other units. In other words, their supply of oil can be secured by providing one set of seal rings 80 and 83. Therefore, oil can be supplied simply by providing one set of the seal rings 82, 80, and 83 each for the hydraulic servos 11, 12, and 13, sliding resistance from the seal rings can be minimized, and therefore the efficiency of the automatic transmission can be improved.

Further, with clutch C2 engaged in first speed reverse, there may be a large difference in rotational speeds between the transmitting member 30 which rotates in reverse and the hub unit 24 that connects this clutch C2 and the sun gear S2 and which has the same rotation as the input shaft 2. However, because this clutch C2 is located on the side of the planetary gear unit PU opposite the second planetary gear unit PR, the transmitting member 30 and the hub unit 24 can be located apart from one another. Compared to the case wherein, for example, those parts come in contact due to a multi-axial construction, the decreased efficiency of the automatic transmission caused by the friction produced by the relative rotation between those parts can be prevented.

Further, because the counter gear 5 is located axially between the first planetary gear unit PU and the second planetary gear unit PR, the counter gear 5 can be located in approximately the axial center of the automatic transmission. For example, when the automatic transmission is mounted on the vehicle, enlargement towards the rear (when the input side from the drive source is the front) is not required because the counter gear 5 is mounted to mate with the drive wheel transmission mechanism. Because of this, particularly in the case of an FF vehicle, the interference with the front wheels is reduced, the mountability on a vehicle is improved, and the steering angle is greatly improved.

Further, the automatic transmission $1_2$ according to the second embodiment is directly coupled in fifth speed forward. Therefore, in first speed forward or fourth speed forward, the gear ratio can be set more precisely, and particularly when the vehicle is running at a high speed, the engine can be operated at lower speed, and this contributes to increased fuel economy of the vehicle while running at a low to medium speed.

Third Embodiment

The third embodiment, which is a partial modification of the first embodiment will now be described with reference to FIG. 5 through FIG. 7. Components of the third embodiment which are the same as those of the first embodiment are denoted by the same reference numerals, and description thereof omitted, except for components which are partially modified.

Figure 5:
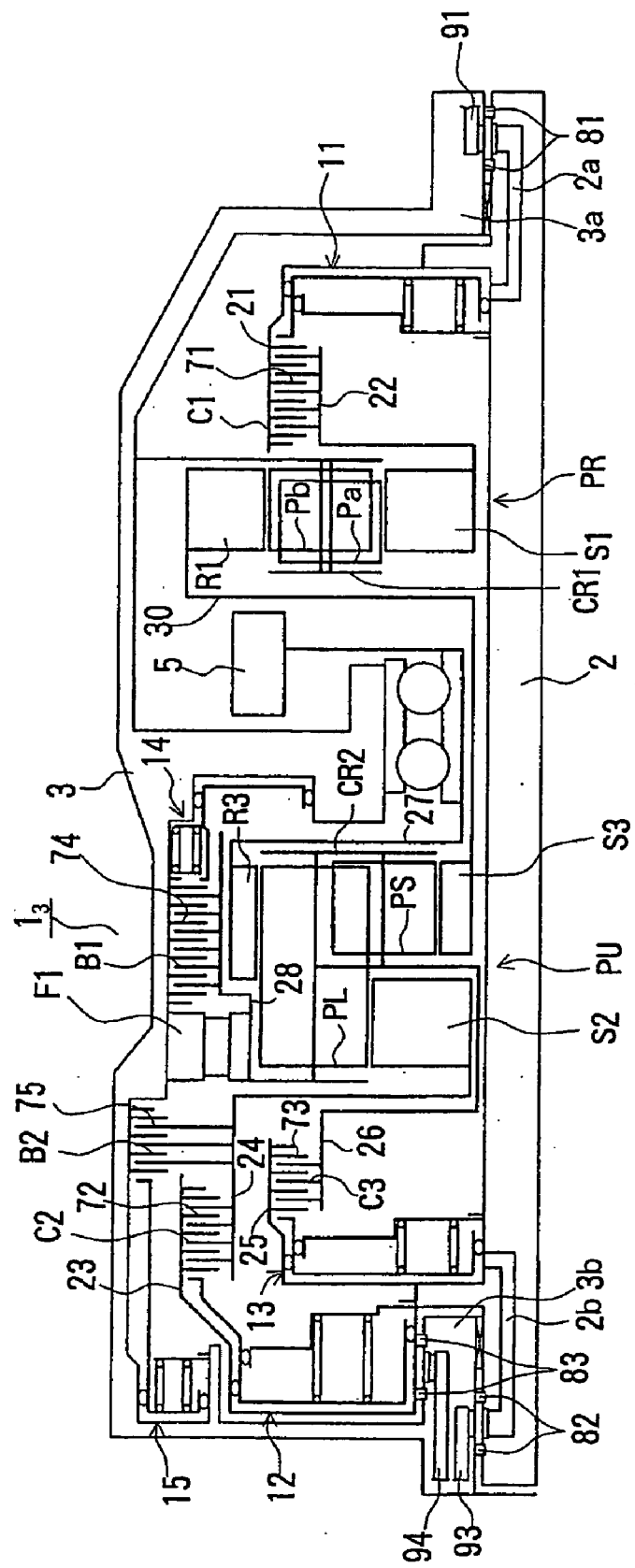
FIG. 5 is a schematic cross-sectional view of an automatic transmission according to a third embodiment of the present invention.

As FIG. 5 illustrates, the automatic transmission $1_3$ of the third embodiment has a modified second planetary gear unit PR and modified clutch C1, and further, a modified oil line for supplying oil pressure to hydraulic servo $1_1$ of the clutch C1, as compared to the automatic transmission 1, of the first embodiment (see FIG. 1).

Within the automatic transmission $1_3$, the clutch C1 is located on the side of the second planetary gear unit PR opposite the planetary gear unit PU. The inner circumferential surface of the drum 21 of clutch C1 is splined to the friction plates 71 which are intermeshed with friction plates splined to the hub unit 22. The drum 21 is connected to the input shaft 2, and the hub unit 22 is connected to the sun gear S1 of the second planetary gear unit PR. The side plate of the carrier CR1 of this second planetary gear unit PR is fixed to and supported by the case 3. Also, the ring gear R1 is connected to the transmitting member 30, and this transmitting member 30 is connected to the sun gear S3. In other words, the ring gear R1 and the sun gear S3 are constantly connected with one another, with no clutch located therebetween, and rotation can be constantly transmitted.

The oil compartment of this hydraulic servo 11 is linked to an oil line 2a which is formed in the input shaft 2, and this oil line 2a is connected to the oil line 91 in the boss 3a which surrounds the input shaft 2 in the form of a sleeve, and this oil line 91 is linked to an oil pressure control unit not illustrated. Therefore, simply by providing one set of the seal rings 81 to form a seal between the input shaft 2 and the boss 3a, an oil line is established between the oil pressure control device (not illustrated) and the oil compartment of the hydraulic servo 11.

The operations of the automatic transmission $1_3$ of the third embodiment will now be described with reference to FIG. 5, FIG. 6, and FIG. 7. Similar to the above-described first embodiment, the vertical axes of the speed line diagram illustrated in FIG. 7 indicate the rotational speeds of each rotary component, and the horizontal axis indicates the corresponding gear ratio of these rotary components. Further, in the first planetary gear unit PU section of this speed line diagram, the vertical axis to the farthest right in FIG. 7 corresponds to the sun gear S3, and moving to the left within the diagram, the vertical axes correspond to the ring gear R3, the carrier CR2, and the sun gear S2. Further, in the second planetary gear unit PR section of the speed line diagram, the vertical axis to the farthest right in FIG. 7 corresponds to the sun gear S1, and moving to the left within the diagram, the vertical axes correspond to, in succession, the ring gear R1 and the carrier CR1. Further, the distances between these vertical axes are inversely proportional to the number of teeth of each of the sun gears S1, S2, S3, and to the number of teeth of each of the ring gears R1, R3. Also, the horizontal dotted line within the diagram represents the rotation transmitted by the transmitting member 30.

As illustrated in FIG. 5, by engaging the clutch C1, the rotation of the input shaft 2 is input to the sun gear S1. Further, the rotation of the above-mentioned carrier CR1 is fixed to the case 3, and the ring gear R1 is rotated at a decreased speed based on the rotation of the input shaft 2 input to sun gear S1. In other words, by engaging the clutch C1, the reduced speed rotation of the ring gear R1 is input to the sun gear S3 via the transmitting member 30.

Figure 7:
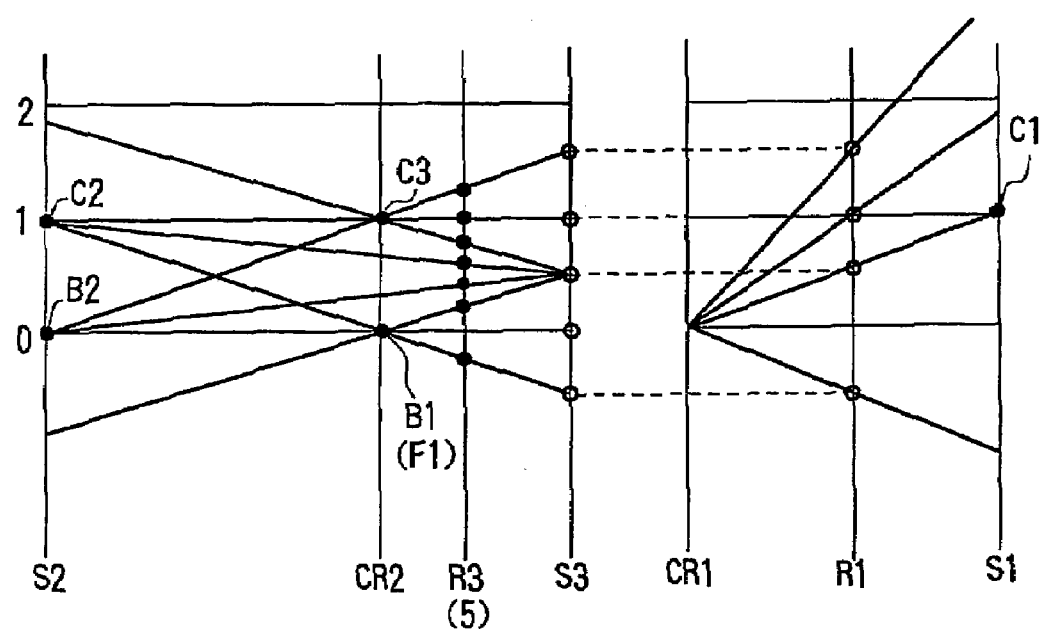
FIG. 7 is a speed line diagram for an automatic transmission according to the third embodiment.

Then, as illustrated in FIG. 6 and FIG. 7, within the second planetary gear unit PR, in first speed forward, second speed forward, third speed forward, and fourth speed forward, the rotation of the input shaft 2 is input to the sun gear S1 by engaging the clutch C1, reduced speed rotation is output to the ring gear R3 from the fixed carrier CR1, and the reduced speed rotation is input to the sun gear S3 via the transmitting member 30. At this time, the ring gear R1 and the sun gear S3 are rotating at a reduced speed, and therefore the transmitting member 30 transmits a relatively large torque. On the other hand, in fifth speed forward, sixth speed forward, and first speed reverse, the rotation of the sun gear S3 is input to the ring gear R1 via the transmitting member 30, and further, because the clutch C1 is released, as illustrated in FIG. 7, the sun gear S1 rotates based on the speed of the ring gear R1 and fixing of the carrier CR1.

The operations of the planetary gearing, other than those of the above-described second planetary gear unit PR, are similar to those of the first embodiment, (see FIG. 2 and FIG. 3), and accordingly, description thereof will be omitted.

As described above, in the automatic transmission $1_3$ of the third embodiment, the second planetary gear unit PR and the clutch C1 are located on one axial side of the first planetary gear unit PU, and the clutch C2 and the clutch C3 are located on the other axial side of the first planetary gear unit PU. Therefore, the automatic transmission of the third embodiment will achieve six forward speeds and one reverse speed, with direct coupling at the fifth speed forward. For example, compared to the case wherein the clutch C2 or clutch C3 is located between the second planetary gear unit PR and the first planetary gear unit PU, in the third embodiment the second planetary gear unit PR and the first planetary gear unit PU can be located closer together, and the transmitting member 30 which transmits the reduced speed rotation can be made relatively short. Therefore, the automatic transmission of the third embodiment can be made more compact and lightweight, and further, because the inertia (inertial force) can be reduced, the controllability of the automatic transmission can be improved, and the occurrence of speed change shock can be reduced.

Further, the clutch C1 is on one axial side of the first planetary gear unit PU, and the clutch C2 and the clutch C3 are located on the other axial side of the planetary gear unit PU, and therefore, compared to the case wherein, for example, the three clutches C1, C2, and C3 are located on one side of the planetary gear unit PU, the construction of an oil line (for example, 2a, 2b, 91, 93, 94) for providing oil pressure to the hydraulic servos 11, 12, and 13 for these clutches C1, C2, and C3 can be made more easily, the manufacturing process can be simplified, and the costs can be reduced.

Further, because the hydraulic servos 11 and 13 are provided on the input shaft 2, one set of the seal rings 81 and 82 provide a seal between the bosses 3a and 3b of the case 3 and the oil lines 2a, and 2b provided within the input shaft 2, and therefore oil can be supplied to the oil compartments of the hydraulic servos 11 and 13 without providing seal rings between, for example, the input shaft 2 and the hydraulic servos 11 and 13. Further, the hydraulic servo 12 can be directly supplied with oil from the boss 3b, i.e., without passing through other units for example. In other words, the supply of oil can be established by providing one set of the seal rings 83. Therefore, oil can be supplied simply by providing sets of seal rings 81 and 82, 83 for the respective hydraulic servos 11, 12, and 13, sliding resistance from the seal rings can be minimized, and therefore the efficiency of the automatic transmission can be improved.

Further, when clutch C2 is engaged in first speed reverse and the transmitting member 30 rotates in reverse, there may be cases wherein by engaging clutch C2, the hub unit 24 connecting this clutch C2 and the sun gear S2 will rotate at the speed of the input shaft 2, and some cases may occur wherein the difference in rotational speeds between the transmitting member 30 and the hub unit 24 may be large. However, because this clutch C2 is located on the side of the first planetary gear unit PU opposite the second planetary gear unit PR, that is to say the transmitting member 30 and the hub unit 24 can be spaced apart, compared with a construction wherein those units are in contact with a multi-axial construction, the loss of efficiency of the automatic transmission produced by friction resulting from the relative rotation between those units can be prevented.

Further, because the counter gear 5 is located axially between the first planetary gear unit PU and the second planetary gear unit PR, the counter gear 5 can be located in approximately the axial center of the automatic transmission. Thus, when the automatic transmission is mounted on the vehicle, enlargement toward the rear (when the input side from the drive source is the front) is not required because the counter gear 5 is mounted to mate with the drive wheel transmission mechanism. Because of this, particularly in the case of a FF vehicle, interference with the front wheels is reduced, the mountability on a vehicle is improved, and the steering angle is greatly improved.

Further, the automatic transmission $1_3$ of the third embodiment is directly coupled in fifth speed forward. Therefore, in first speed forward and fourth speed forward, the gear ratio can be more precisely set for best efficiency, and particularly when the vehicle is running at a high speed, the engine speed can be reduced, and this contributes to increased fuel economy of the vehicle while running at a low to medium speed.

Japanese Unexamined Patent Application Publication No. 8-68456 discloses a transmission wherein a clutch is located in the power path of reduced speed rotation transfer from the speed reducing planetary gear unit to the rotary component of the first planetary gear unit, and because this power path transmits this reduced speed rotation with high torque, the clutch or members within the power path that transmits the high torque must be constructed so as to withstand this high torque. Further, the member(s) constituting the power path line for transmitting this reduced speed rotation rotate at a high speed, for example, when in sixth speed forward, and therefore, as in the above-mentioned Publication, in the event that the transmission member(s) links the drum of the clutch to the input rotary component of the first planetary gear unit, controllability is lost when engaging and releasing this clutch because the drum unit changes shape because of the centrifugal force generated at high speed. Therefore, it is an object of the present invention to provide an automatic transmission wherein the controllability of the clutch utilized as a reduced speed rotation output means, is not lost even at high speed rotation of the rotary component of the first planetary gear unit.

In the automatic transmission $1_3$ of the third embodiment, the clutch C1 connects/disconnects the input shaft 2 and the sun gear S1 and, therefore, compared for example, with a transmission wherein the clutch C1 connects/disconnects the ring gear R1 and the sun gear S3, the load on the clutch C1 is less, loss of controllability of the clutch C1 is prevented, and further, the clutch C1 can be made more compact.

Further, the drum 21 of the clutch C1 is linked to the input shaft 2, and the hub unit 22 is linked to the sun gear S1 of the second planetary gear unit PR, and therefore, the hub unit 22 which has a smaller diameter than the clutch drum 21 can be linked, for example, with the sun gear S1 that rotates at a high speed when in sixth speed forward. Thus, compared to the case wherein the sun gear S1 is linked to the clutch drum, in this third embodiment the centrifugal force can be reduced, and reduction of controllability of the clutch C1 when engaging and releasing can be prevented.

Fourth Embodiment

The fourth embodiment, which is a partial modification of the third embodiment will be described with reference to FIG. 8. Components of the fourth embodiment which are the same as those of the third embodiment are denoted by the same reference numerals, and description thereof omitted, except for the modified components.

Figure 8:
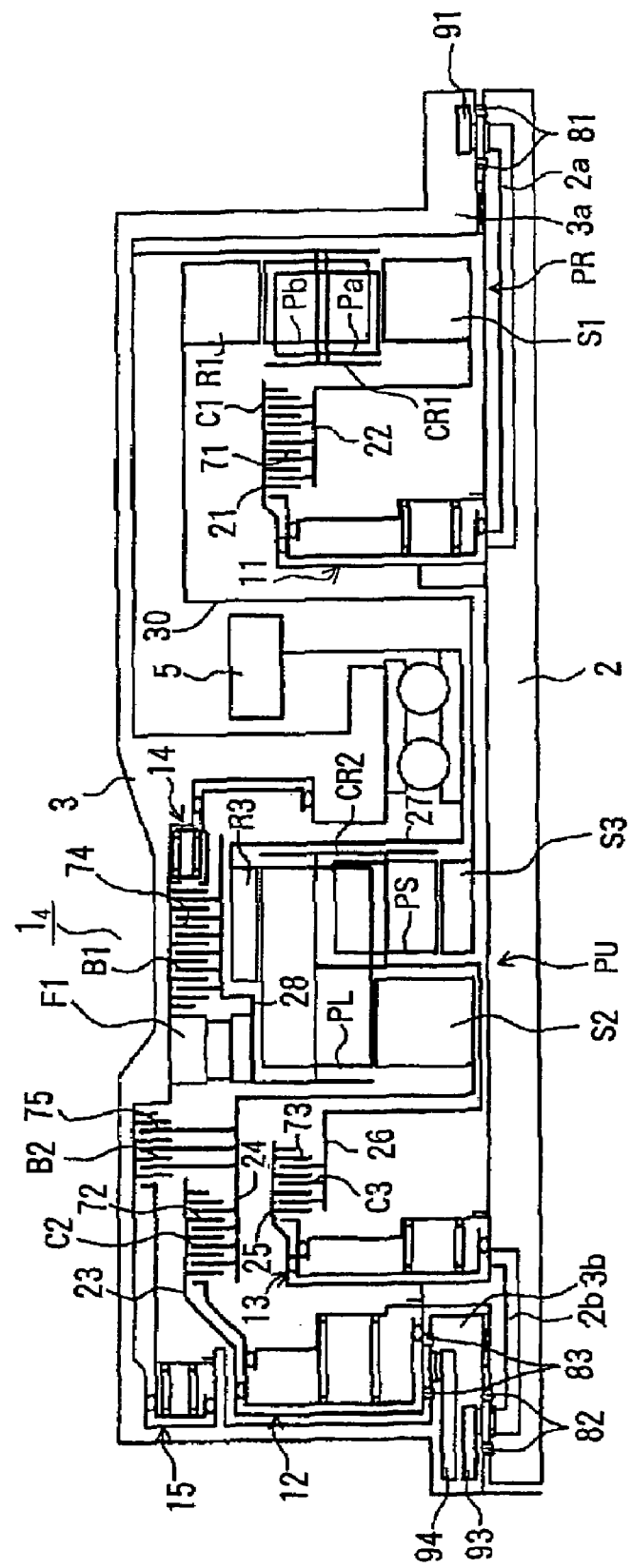
FIG. 8 is a schematic cross-sectional view of an automatic transmission according to a fourth embodiment of the present invention.

As FIG. 8 illustrates, the automatic transmission $1_4$ of the fourth embodiment has a modified second planetary gear unit PR and clutch C1, i.e., modification of the automatic transmission of the third embodiment (see FIG. 5).

With the automatic transmission $1_4$, the clutch C1 is disposed axially between the second planetary gear unit PR and the first planetary gear unit PU, specifically between the second planetary gear unit PR and the counter gear 5. The drum 21 is connected to one end of the input shaft 2 (at the upper right side in the drawing), and the friction plates 71 of the clutch C1, which are engaged under control of the clutch C1 hydraulic servo 11, are splined to the inner circumferential surface at the front end of the drum 21 and are intermeshed with friction plates splined to a hub unit 22, and this hub unit 22 is connected to the sun gear S1 of the second planetary gear unit PR.

The carrier CR1 of the second planetary gear unit PR carries a pinion Pb which meshes with the above-mentioned ring gear R1, and a pinion Pa which meshes with the sun gear S1 which is connected to the hub unit 22. The carrier CR1 is fixed to the case 3 through the side plate, and the ring gear R1 is connected with the transmitting member 30. The sun gear S3 of the first planetary gear unit PU is connected to the other end of the transmitting member 30.

Also, the oil chamber "a" of the hydraulic servo 11 of the clutch C1 communicates with the oil path 2a of the input shaft 2, and the oil path 2a communicates with an oil pressure control device through the oil path 91 of the boss 3a. In other words, because the hydraulic servo 11 is mounted on the input shaft 2, an oil path from the oil pressure control unit to the oil chamber "a" of the hydraulic servo 11 is constructed by one set of seal rings 81 which provides a seal between this boss 3a and the input shaft 2.

The operations of the automatic transmission $1_4$ of this fourth embodiment are the same as those of the third embodiment (see FIG. 6 and FIG. 7), and accordingly, description thereof will be omitted.

As described above, in the automatic transmission 14 of the fourth embodiment, the second planetary gear unit PR and the clutch C1 are located on one axial side of the first planetary gear unit PU, and the clutch C2 and the clutch C3 are located on the other axial side of the first planetary gear unit PU. The automatic transmission of the fourth embodiment provides six forward speeds and one reverse speed, with direct coupling in fifth speed forward. For example, compared to a transmission wherein the clutch C2 or clutch C3 is located between the second planetary gear unit PR and the first planetary gear unit PU, in this fourth embodiment the second planetary gear unit PR and the first planetary gear unit PU can be located closer together, and the transmitting member 30 which transmits the reduced speed rotation can be made relatively short. Therefore, the automatic transmission can be made more compact and lightweight, and further, because the inertia (inertial force) can be reduced, the controllability of the automatic transmission can be improved, and the occurrence of speed change shock can be reduced.

Further, the clutch C1 is located on one axial side of the planetary gear unit PU, and the clutch C2 and the clutch C3 are located on the other axial side of the planetary gear unit PU. Therefore, compared to a transmission wherein, for example, the three clutches C1, C2, and C3 are located on one axial side of the planetary gear unit PU, the construction of an oil line (for example, 2a, 2b, 91, 93, 94) to provide oil to the hydraulic servos 11, 12, and 13 which operate, respectively, clutches C1, C2, and C3 can be easily made, the manufacturing process can be simplified and the costs reduced.

Further, because the hydraulic servos 11 and 13 are on the input shaft 2, one set of the seal rings 81 and 82 provides a seal between the case 3 and oil lines 2a, and 2b provided within the input shaft 2, and therefore oil can be supplied to the oil compartments of the hydraulic servos 11 and 13 without providing seal rings between, for example, the input shaft 2 and the hydraulic servos 11 and 13. Further, the hydraulic servo 12 can receive supply of oil directly from the boss 3b without passing through other units. In other words, oil supply paths are established by providing one set of seal rings 81 and 82, 83 each for the hydraulic servos 11, 12, and 13, sliding resistance from the seal rings can be minimized, and therefore the efficiency of the automatic transmission can be improved.

Further, when the clutch C2 is engaged in first speed reverse, the transmitting member 30 rotates in reverse, the hub unit 24 that connects this clutch C2 and the sun gear S2 has the same rotation as the input shaft 2, and there may be a large difference in rotation speeds of the transmitting member 30 and the hub unit 24. However, because this clutch C2 is located on the side of the planetary gear unit PU opposite the second planetary gear unit PR, the transmitting member 30 and the hub unit 24 can be spaced apart from one another. Compared to the case wherein, for example, those parts come in contact due to a multi-axial construction, the decrease in efficiency of the automatic transmission caused by the friction produced by the relative rotation between those parts can be prevented.

Further, because the counter gear 5 is located axially between the first planetary gear unit PU and the second planetary gear unit PR, the counter gear 5 can be located in approximately the center of the automatic transmission. When the automatic transmission is mounted on the vehicle, enlargement toward the rear (when the input side from the drive source is the front) is unnecessary because the counter gear 5 is mounted to mate with the drive wheel transmission mechanism. Because of this, particularly in the case of a FF vehicle, interference with the front wheels is reduced, mountability on a vehicle is improved, and the steering angle is greatly improved.

Further, the automatic transmission $1_4$ in the fourth embodiment is also directly coupled at fifth speed forward. Therefore, in first speed forward or fourth speed forward, the gear ratio can be more precisely set for maximum efficiency, and particularly when the vehicle is running at a high speed, the engine speed can be reduced, and this contributes to increased fuel economy of the vehicle while running at a low to medium speed.

In the automatic transmission $1_4$ according to the fourth embodiment, the clutch C1 selectively connects/disconnects the input shaft 2 and the sun gear S1. Therefore, compared with, for example, a transmission wherein the clutch C1 connects the ring gear R1 and the sun gear S3, the load on the clutch C1 can be reduced, reduction in control of the clutch C1 is prevented, and further, the clutch C1 can be made more compact.

Further, the drum 21 of the clutch C1 is linked to the input shaft 2, and the hub unit 22 is linked to the sun gear S1 of the second planetary gear unit PR, and therefore, the hub unit 22 which has a smaller diameter than the drum 21 can be linked for example with the sun gear S1 that rotates at a high speed when in sixth speed forward and, compared to the case wherein the sun gear S1 is linked to the drum, the centrifugal force can be reduced, and reduction of controllability of the clutch C1 can be prevented.

Fifth Embodiment

The fifth embodiment, which is a partial modification of the third embodiment will now be described with reference to FIG. 9. Components of the fifth embodiment which are the same as those of the third embodiment are denoted by the same reference numerals, and description thereof omitted, except for the modified components.

Figure 9:
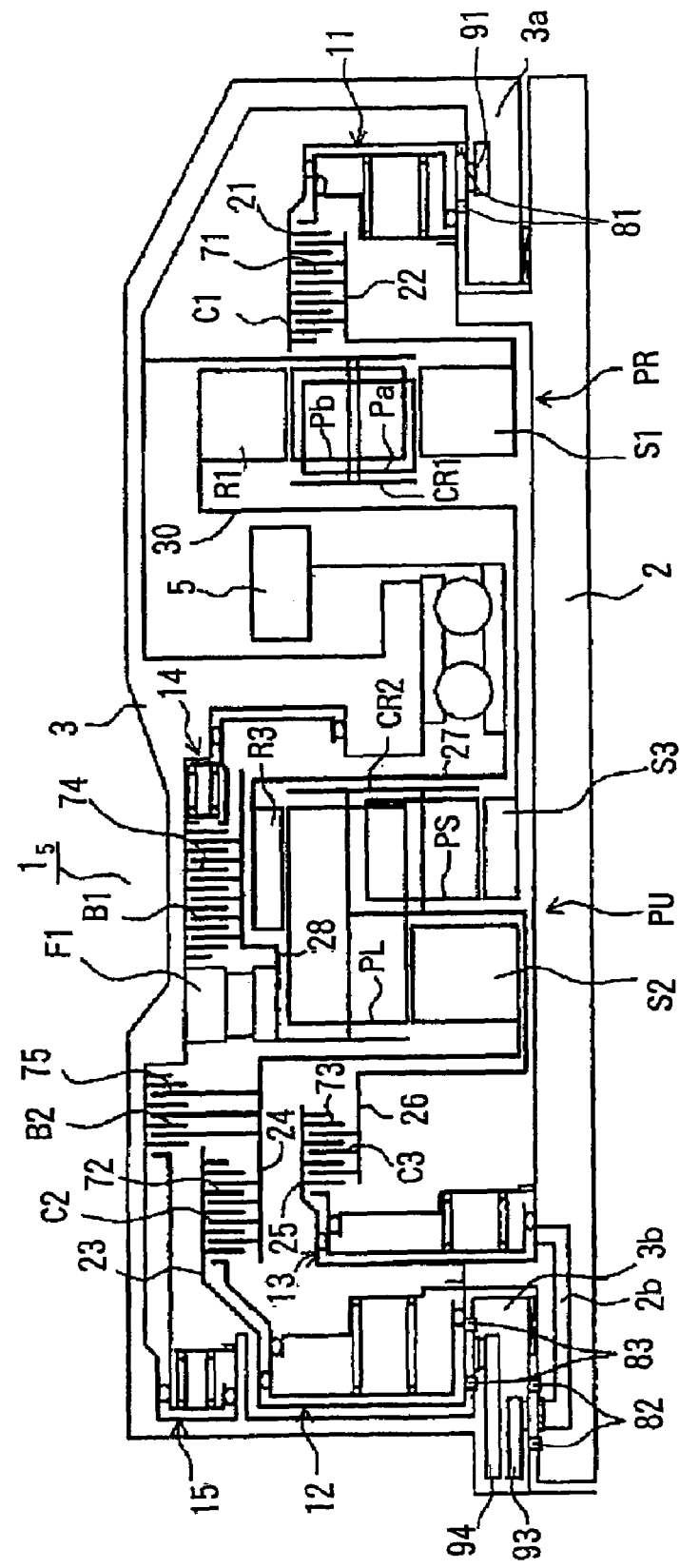
FIG. 9 is a schematic cross-sectional view of an automatic transmission according to a fifth embodiment.

As FIG. 9 illustrates, the automatic transmission $1_5$ of the fifth embodiment has clutch C1 mounted on the boss 3a, rather than on the input shaft 2, and in this respect differs from the automatic transmission 1₃ of the third embodiment (see FIG. 5).

In the automatic transmission 1₅ of the fifth embodiment, the clutch C1 is disposed on the side of the second planetary gear unit PR opposite the first planetary gear unit PU (to the right in the drawing). The drum 21 is rotatably supported on the boss 3a extending from the case 3, and the inner circumferential surface at the front end of the drum 21 of the clutch C1 is connected to the input shaft 2. The friction plates 71 are splined to the inner circumferential surface, at the front end, of the drum 21, and are intermeshed with friction plates splined to the hub unit 22 connected to the second sun gear S1 of the second planetary gear unit PR.

The carrier CR1 of the second planetary gear unit PR has pinion Pb which meshes with the ring gear R1, and pinion Pa which meshes with the sun gear S1 connected to the hub unit 22. The carrier CR1 is fixed to the case 3 through a side plate, and the ring gear R1 is connected to one end of the transmitting member 30. The sun gear S3 of the first planetary gear unit PU is connected to the other end of the transmitting member 30.

The oil chamber "a" of the hydraulic servo 11 of the clutch C1 communicates with the oil path 91 in the boss 3a, and the oil path 91 communicates with an unshown oil pressure control device. In other words, because the hydraulic servo 11 is mounted on the boss 3a, an oil supply path from the oil pressure control unit to the oil chamber "a" of the hydraulic servo 11 is constructed with one set of seal rings 81 which provide a seal between the boss 3a and the hydraulic servo 11.

The operations of the automatic transmission 1₅ of the fifth embodiment are the same as those of the third embodiment (see FIG. 6 and FIG. 7), and accordingly, description thereof will be omitted.

As described above, in the automatic transmission 1₅ of the fifth embodiment, the second planetary gear unit PR and the clutch C1 are located on one axial side of the first planetary gear unit PU, and the clutch C2 and the clutch C3 are located on the other axial side of the first planetary gear unit PU. The automatic transmission of the fifth embodiment provides six forward speeds and one reverse speed, with direct coupling in fifth speed forward. In this fifth embodiment also, compared to the case wherein the clutch C2 or clutch C3 is located between the second planetary gear unit PR and the first planetary gear unit PU, the second planetary gear unit PR and the first planetary gear unit PU can be located closer together, and the transmitting member 30 for transmitting the reduced speed rotation can be made relatively shorter. Therefore, the automatic transmission can be made more compact and lightweight, and further, because the inertia (inertial force) can be reduced, the controllability of the automatic transmission can be improved, and the occurrence of speed change shock can be reduced.

Because the clutch C1 is located on one axial side of the first planetary gear unit PU, and the clutch C2 and the clutch C3 are located on the other axial side of the first planetary gear unit PU, compared with the case wherein the three clutches C1, C2, and C3 are located on one axial side of the first planetary gear unit PU, the construction of an oil supply path (for example, 2a, 2b, 91, 93, 94) for providing oil to the hydraulic servos 11, 12, and 13 can be made more easily, the manufacturing process can be simplified and the costs brought down.

Further, because the hydraulic servos 11 and 13 are mounted on the input shaft 2, the sets of seal rings 81 and 82 seal the bosses 3a and 3b respectively to the oil lines 2a, and 2b provided within the input shaft 2, and therefore oil can be supplied to the respective oil compartments of the hydraulic servos 11 and 13 without providing seal rings between, for example, the input shaft 2 and the hydraulic servos 11 and 13. Further, the hydraulic servo 12 can be supplied oil from the boss unit 3b extending from the case 3, without that supply passing through other units or, in other words, can be established by providing one set of the seal rings 83. Therefore, an oil path can be established simply by providing one set of the seal rings 81 and 82, 83 for each of the hydraulic servos 11, 12, and 13, sliding resistance from the seal rings can be minimized, and therefore the efficiency of the automatic transmission can be improved.

Further, when clutch C2 is engaged in first speed reverse, the transmitting member 30 rotates with reverse rotation, and while the hub unit 24 that connects this clutch C2 and the sun gear S2 has the same rotation as the input shaft 2 due to engagement of clutch C2, the difference between rotational speeds of the transmitting member 30 and the hub unit 24 may be large. However, because this clutch C2 is located on the side of the planetary gear unit PU opposite the second planetary gear unit PR, the transmitting member 30 and the hub unit 24 can be spaced apart from one another. Compared to the case wherein, for example, those parts come in contact due to a multi-axial construction, the decreased efficiency of the automatic transmission caused by the friction produced by the relative rotation between those parts can be prevented.

Further, because the counter gear 5 is located axially between the first planetary gear unit PU and the second planetary gear unit PR, the counter gear 5 can be positioned in approximately the axial center of the automatic transmission. In this manner, enlargement of the transmission towards the rear (when the input side facing the drive source is the front) is not necessary because the counter gear 5 is mounted to mate with the drive wheel transmission mechanism. Because of this, particularly in the case of a FF vehicle, the interference with the front wheels is reduced, the mountability on a vehicle is improved, and the steering angle is greatly improved, for example.

Further, because the automatic transmission 1₅ according to the fifth embodiment is directly coupled in fifth speed forward in first speed forward or fourth speed forward, the gear ratio can be more precisely set for efficiency, and particularly when the vehicle is running at a high speed, the engine can be operated more efficiently, and this contributes to increased fuel economy of the vehicle while running at a low to medium speed.

Further, in the automatic transmission 1₅ of the fifth embodiment, the clutch C1 engages/disengages the input shaft 2 and the sun gear S1 and, therefore, compared with, for example, the case wherein the clutch C1 engages/disengages the ring gear R1 and the sun gear S3, the load on the clutch C1 is reduced, controllability of the clutch C1 is retained, and further, the clutch C1 can be made more compact.

Further, the clutch C1 is mounted on the boss 3a wherein the oil path 91 from the oil pressure control device is formed, and accordingly, the automatic transmission 15 can be can be made more axially compact as compared with the case wherein the clutch C1 is mounted on the input shaft 2, for example (see FIG. 5).

Further, the drum 21 of the clutch C1 is linked to the input shaft 2, and the hub unit 22 is linked to the sun gear S1 of the second planetary gear unit PR and, therefore, the hub unit 22 which has a smaller diameter than the drum 21 can be linked for example, with the sun gear S1 that rotates at a high speed in sixth speed forward, and compared to the case wherein the sun gear S1 is linked to the drum-shaped member, the centrifugal force can be reduced, and controllability of the clutch C1 when engaging and releasing can be retained.

Sixth Embodiment

Next, the sixth embodiment, which is a partial modification of the first embodiment, will be described with reference to FIG. 10 through FIG. 12. Components of the sixth embodiment which are the same as those of the first embodiment are denoted by the same reference numerals, and description thereof omitted, except where modified.

Figure 10:
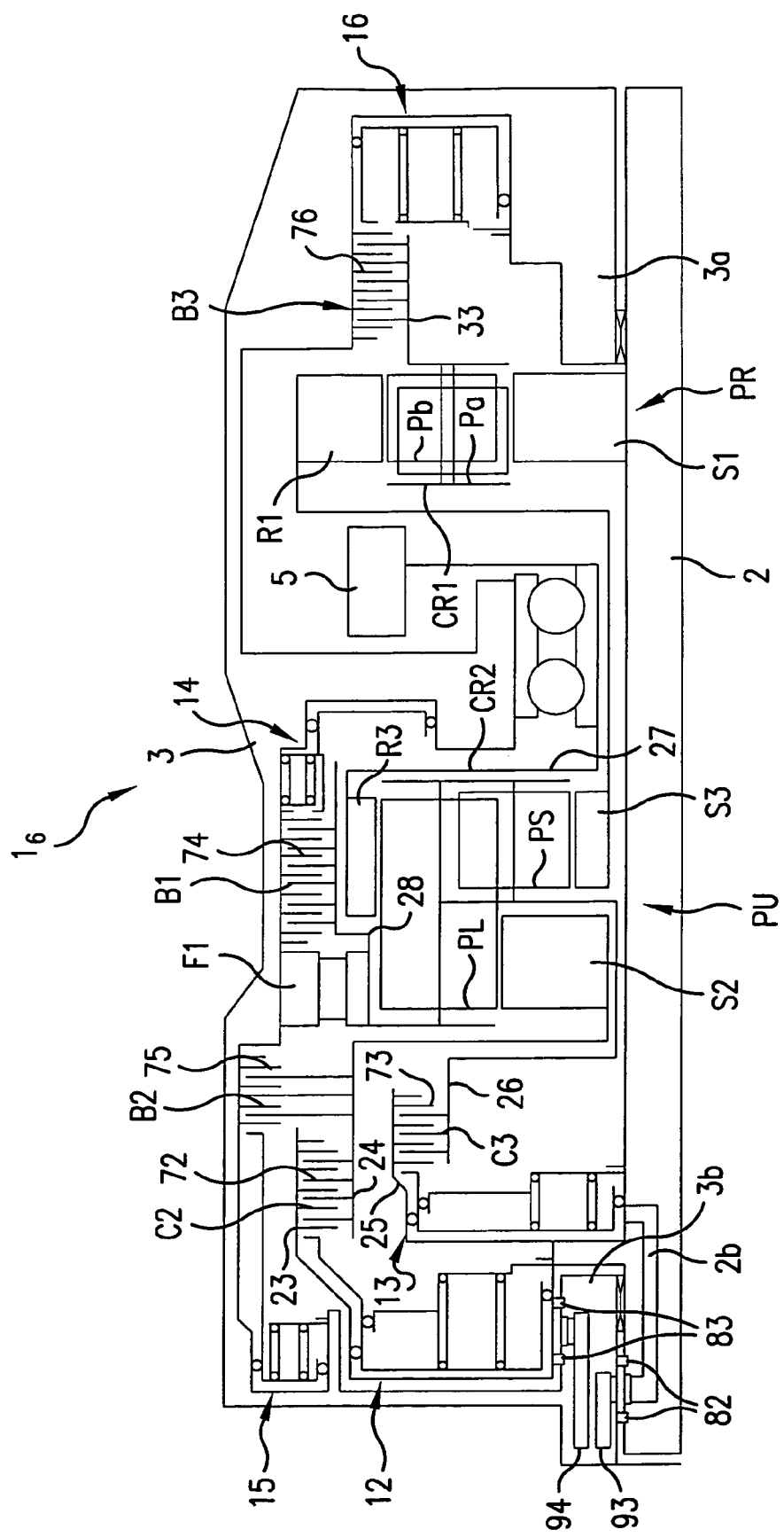
FIG. 10 is a schematic cross-sectional view of an automatic transmission according to a sixth embodiment.

As FIG. 10 illustrates, the automatic transmission $1_6$ of the sixth embodiment includes a brake B3 (the "reduced speed rotation output means", the "third engaging component", the "third brake") in place of the clutch C1, and the carrier CR1 of the second planetary gear unit PR is capable of being fixed by the brake B3, in which respects it differs from automatic transmission $1_1$ of the automatic transmission of the first embodiment (see FIG. 1).

The brake B3 is located on the side of the second planetary gear unit PU opposite the first planetary gear unit PU (right side of the diagram). This brake B3 comprises a hydraulic servo 16, friction plates 76, and a hub unit 33.

The hub unit 33 of brake B3 is connected to one side plate of the carrier CR1, and carrier CR1 is rotatably supported by the input shaft 2 or the boss 3a. Further, the sun gear S1 is connected to the input shaft 2. Also, ring gear R1 is connected to the sun gear S3 via transmitting member 30.

Operations of the automatic transmission $1_6$ will now be described with reference to FIG. 11 and FIG. 12. As described in connection with the first embodiment, the vertical lines in the speed line diagram of FIG. 12 indicate the speeds of various rotary components, and the horizontal axis shows the corresponding gear ratios of these components. In the first planetary gear unit PU section of this speed line diagram, the vertical axis to the farthest right side in FIG. 12 corresponds to the sun gear S3 and, moving to the left within the diagram, the vertical lines correspond to the ring gear R3, the carrier CR2, and the sun gear S2. Further, in the second planetary gear unit PR section of this speed line diagram, the vertical axis to the farthest right side of FIG. 12 corresponds to the sun gear S1 and, moving to the left within the diagram, the vertical lines correspond to the ring gear R1 and the carrier CR1. Further, the distances between these vertical lines are inversely proportional to the number of teeth of each of the sun gears S1, S2, S3, and to the number of teeth of each of the ring gears R1, R3. Also, the dotted horizontal line within the diagram represents the rotation transmitted by the transmitting member 30.

As illustrated in FIG. 10, the carrier CR1 is fixed to the case 3 by engagement of the brake B3. Further, the rotation of the input shaft 2 is input to the sun gear S1, and the ring gear R1 rotates a lower speed that the speed of rotation of the input shaft 2 that is input to the sun gear S1, with carrier CR1 being fixed. In other words, the reduced speed rotation of the ring gear R1 is input to the sun gear S3 via the transmitting member 30, by engaging the brake B3.

Figure 12:
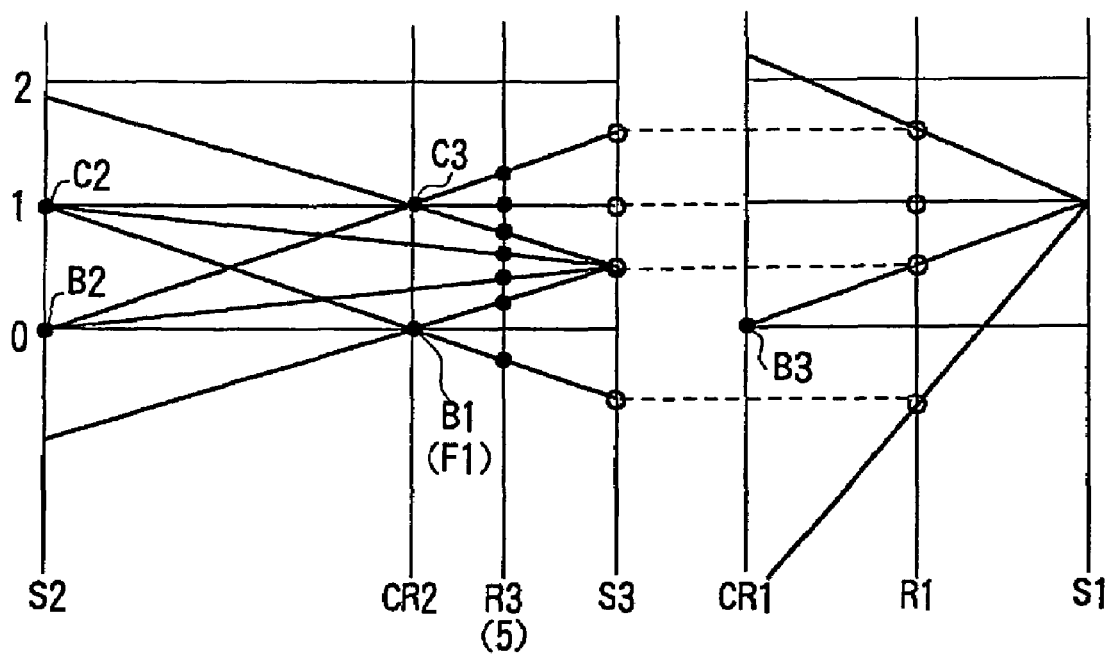
FIG. 12 is a speed line diagram for the automatic transmission of the sixth embodiment.

As FIG. 11 and FIG. 12 illustrate, regarding the second planetary gear unit PR, in first speed forward, second speed forward, third speed forward, and fourth speed forward, the rotation of the input shaft 2 is input to the sun gear S1 by engaging the brake B3, the carrier CR1 is fixed, and the reduced speed rotation is output to the ring gear R3 by the rotation of the sun gear S1 which receives the rotation of the input shaft 2, and the reduced speed rotation is input to the sun gear S3 via the transmitting member 30. In this case, the ring gear R1 and the sun gear S3 are rotating at reduced speed, and therefore the transmitting member 30 transmits a relatively large torque. On the other hand, in fifth speed forward, sixth speed forward, and first speed reverse, the rotation of the sun gear S3 is input to the ring gear R1 via the transmitting member 30, and further, because the brake B3 is released, as FIG. 12 illustrates, the carrier CR1 rotates based on the speed of ring gear R1 and the sun gear S1.

The operations of the second planetary gear unit of the sixth embodiment, other than those mentioned above, are similar to those of the above-described first embodiment, and accordingly, description thereof will be omitted.

As described above, in the automatic transmission $1_6$ of the sixth embodiment, the second planetary gear unit PR and the brake B3 are located on one axial side of the first planetary gear unit PU, and the clutch C2 and the clutch C3 are located on the other axial side of the first planetary gear unit PU. Therefore, the automatic transmission will achieve six forward speeds and one reverse speed, with direct coupling in fifth speed forward. Compared, for example, with the case wherein the clutch C2 or clutch C3 is located between the second planetary gear unit PR and the first planetary gear unit PU, the second planetary gear unit PR and the first planetary gear unit PU can be located closer together, and the transmitting member 30 can be made relatively shorter. Therefore, the automatic transmission can be made more compact and lightweight, and further, because the inertia (inertial force) can be reduced, the controllability of the automatic transmission can be improved, and the occurrence of speed change shock can be reduced.

Further, because the hydraulic servo 13 is mounted on the input shaft 2, one set of the seal rings 82 form a seal between the boss 3b and oil lines 2b provided within the input shaft 2, and therefore oil can be supplied to the oil compartment of the hydraulic servo 13 without providing seal rings between, for example, the input shaft 2 and the hydraulic servo 13. Further, the hydraulic servo 12 can receive oil directly from the boss 3b, i.e., without passing through other units. In other words, supply of oil is secured by providing one set of seal rings 83. Therefore, oil can be supplied simply by providing one set of seal rings 82 and 83 for each of the hydraulic servos 12 and 13, sliding resistance from the seal rings can be minimized, and therefore the efficiency of the automatic transmission can be improved.

Further, when the clutch C2 engages in first speed reverse, the transmitting member 30 rotates in reverse, and the hub unit 24, that connects this clutch C2 and the sun gear S2, has the same rotational speed as the input shaft 2, and the difference in rotational speed between the transmitting member 30 and the hub unit 24 may be large. However, because this clutch C2 is located on the side of the first planetary gear unit PU opposite the second planetary gear unit PR, the transmitting member 30 and the hub unit 24 can be spaced apart from one another. Compared to the case wherein, for example, those parts come in contact in a multi-axial construction, loss in efficiency of the automatic transmission caused by the friction produced by the relative rotation between those parts can be prevented.

Further, because the counter gear 5 is located axially between the first planetary gear unit PU and the second planetary gear unit PR, the counter gear 5 can be located in approximately the axial center of the automatic transmission. As in the previous embodiments, when the automatic transmission is mounted on the vehicle, enlargement towards the rear (when the input side facing the drive source is the "front") is not necessary because the counter gear 5 is mounted to mate with the drive wheel transmission mechanism. Because of this, particularly in the case of a FF vehicle, interference with the front wheels is reduced, mountability on a vehicle is improved, and the steering angle can be greatly improved, for example.

Further, because output of the reduced speed rotation to the first planetary gear unit PU from the second planetary gear unit PR is controlled by engagement and disengagement of the brake B3, the number of components (for example clutch drums and so forth) can be reduced as compared to the case wherein, for example, a clutch C1 is provided. Further, because the brake B3 can receive oil directly from the case 3, construction of an oil line can be simplified as compared to the case wherein, for example, a clutch C1 is provided.

Further, because the automatic transmission $1_6$ of the sixth embodiment is directly coupled at fifth speed forward, in first speed forward or fourth speed forward, the gear ratio can be better set for efficiency, and particularly when the vehicle is running at a high speed, the engine can be run with better efficiency, and this contributes to increased fuel economy of the vehicle while running at a low to medium speed.

In the automatic transmission $1_6$ of the sixth embodiment, the carrier CR1 is fixed by the brake B3, and therefore, compared to the case wherein a clutch is used to connect/disconnect ring gear R1 and the sun gear S3, the load on the brake B3 can be reduced, this brake B3 can be made more compact, and the automatic transmission can also be made more compact.

While the first through sixth embodiments relating to the present invention have been described above as being applicable to an automatic transmission having a torque converter, they are not so limited, and any motion starting device may be used that transmits torque (rotation) at start of movement. Further, while described as mounted on a vehicle with an engine as a drive source, the invention is not so limited, and any drive source may be used as a matter of course, and the transmission of the present invention may be mounted on a hybrid vehicle. Further, while the above-described automatic transmission embodiments are favorably used in a FF vehicle, again the present invention is not so limited, and can be used in a FR vehicle, a four-wheel drive vehicle, or vehicles with other types of drive systems.

Further, while the speed reducing planetary gear unit according to the above first through sixth embodiments has been described as reducing rotational speed of the ring gear by fixing the carrier while inputting the rotation of the input shaft into the sun gear, the invention is not so limited, and may reduce rotational speed of the ring gear by fixing the sun gear while inputting the rotation of the input shaft into the carrier.

As described above, the automatic transmission according to the present invention is beneficially mounted on vehicles, such as automobiles, trucks, busses, and so forth, which require reduction in size and reduction in weight and further require reduction of shock in changing speeds.

The invention claimed is:

1. An automatic transmission comprising:
a rotatably driven input shaft;
a first planetary gear unit including first, second, third, and fourth rotary components;
reduced speed rotation output means for receiving input rotation from said input shaft, for reducing the speed of the input rotation and for outputting rotation at the reduced speed to said first rotary component, said reduced speed rotation output means comprising a speed reducing second planetary gear unit that comprises a reduced speed rotary element, an engaging component for controlling rotation of the reduced speed rotary element, an input rotary component that receives as input the rotation of said input shaft, and a carrier, said reduced speed rotary element being rotatable at a reduced speed based on the rotation of said input rotary element and fixation against rotation of said intermediate element;
a first clutch that is engageable to connect said input shaft and said second rotary component;
a second clutch that is engageable to connect said input shaft and said third rotary component;
an output unit for outputting the rotation of said fourth rotary component;
wherein said automatic transmission provides at least five forward speeds, one reverse speed, and a directly coupled state wherein the rotation of the input shaft is output without change in speed by engagement of said first clutch and said second clutch in fifth speed;
wherein said reduced speed rotation output means is located on one axial side of said first planetary gear unit, and said output unit is located between said first planetary gear unit and said reduced speed rotation output means;
wherein said first clutch and said second clutch are located on the axial side of said first planetary gear unit opposite said one axial side; and
wherein said engaging component is a brake for fixing the intermediate element against rotation; wherein said brake is on the axial side of said first planetary gear unit opposite said speed reducing second planetary gear unit; and said brake is operated by a hydraulic servo formed in a wall of a case housing said first planetary gear unit.

2. An automatic transmission comprising:
a rotatably driven input shaft;
a multiple type planetary gear unit comprising a first sun gear, a long pinion which meshes with said first sun gear, a short pinion which meshes with said long pinion, a carrier for rotatably supporting said long pinion and said short pinion, a second sun gear meshing with said short pinion, and a ring gear meshing with said long pinion;
reduced speed rotation output means for receiving input rotation from said input shaft, for reducing the speed of the input rotation and for outputting rotation at the reduced speed to said second sun gear;
a first clutch that is engageable to connect said input shaft and said first sun gear;
a second clutch that is engageable to connect said input shaft and said carrier;
an output unit for outputting the rotation of said ring gear;
wherein said automatic transmission provides at least five forward speeds, one reverse speed, and a directly coupled state wherein the rotation of the input shaft is output without change in speed by engagement of said first clutch and said second clutch in fifth speed;
wherein said reduced speed rotation output means is located on one axial side of said planetary gear unit, and said output unit is located between said planetary gear unit and said reduced speed rotation output means;
wherein said first clutch and said second clutch are located on the axial side of said planetary gear unit opposite said one axial side;

wherein said second sun gear receives the reduced speed rotation of said reduced speed rotation output means;
wherein said first sun gear receives input of rotation from said input shaft when said first clutch is engaged, and is fixed against rotation by engagement of a first brake;
wherein said carrier receives input of rotation of said input shaft when said second clutch is engaged, and is fixed against rotation by engagement of a second brake; and
wherein said ring gear is linked to said output member.

3. An automatic transmission comprising:
a rotatably driven input shaft;
a first planetary gear unit including first, second, third, and fourth rotary components;
reduced speed rotation output means for receiving input rotation from said input shaft, for reducing the speed of the input rotation and for outputting rotation at the reduced speed to said first rotary component, said reduced speed rotation output means comprising a speed reducing second planetary gear unit that comprises a reduced speed rotary element, an engaging component for controlling rotation of the reduced speed rotary element, an input rotary element that receives input of the rotation of said input shaft, and an intermediate element, said reduced speed rotary element being rotatable at a reduced speed based on the rotation of said input rotary element and fixation against rotation of said intermediate element;
a first clutch that is engageable to connect said input shaft and said second rotary component;
a second clutch that is engageable to connect said input shaft and said third rotary component;
an output unit for outputting the rotation of said fourth rotary component;
wherein said automatic transmission provides at least five forward speeds, one reverse speed, and a directly coupled state wherein the rotation of the input shaft is output without change in speed by engagement of said first clutch and said second clutch in fifth speed;
wherein said reduced speed rotation output means is located on one axial side of said first planetary gear unit, and said output unit is located between said first planetary gear unit and said reduced speed rotation output means;
wherein said first clutch and said second clutch are located on the axial side of said first planetary gear unit opposite said one axial side; and
wherein said engaging component is a third clutch that selectively connects said reduced speed rotary element and said first rotary component.

4. An automatic transmission according to claim 3,
wherein said hub unit is linked with said input rotary element; and
wherein said drum unit is linked to said input shaft and is positioned so as to open toward said speed reducing second planetary gear unit.

5. An automatic transmission according to claim 4, wherein said third hydraulic servo is mounted on said input shaft; and
wherein oil is supplied to said third hydraulic servo via an oil path within said input shaft.

6. An automatic transmission according to claim 4, wherein said third hydraulic servo is mounted on a boss extending from the case; and
oil is supplied to said third hydraulic servo via an oil path provided within said boss.

7. An automatic transmission comprising:
a case;
a rotatably driven input shaft;
a first planetary gear unit mounted within said case and including first, second, third, and fourth rotary components;
reduced speed rotation output means for receiving input rotation from said input shaft, for reducing the speed of the input rotation and for outputting rotation at the reduced speed to said first rotary component, said reduced speed rotation output means comprising a speed reducing second planetary gear unit that has a reduced speed rotary element and an engaging component for controlling rotation of the reduced speed rotary element, wherein said reducing second planetary gear unit comprises an input rotary element that continuously receives input of the rotation of said input shaft, an intermediate element, and said reduced speed rotary element, said reduced speed rotary element being rotated at a reduced speed based on the rotation of said input rotary element and fixation against rotation of said intermediate element;
a first clutch that is engageable to connect said input shaft and said second rotary component;
a second clutch that is engageable to connect said input shaft and said third rotary component;
an output unit for outputting the rotation of said fourth rotary component;
wherein said automatic transmission provides at least five forward speeds, one reverse speed, and a directly coupled state wherein the rotation of the input shaft is output without change in speed by engagement of said first clutch and said second clutch in fifth speed;
wherein said reduced speed rotation output means is located on one axial side of said first planetary gear unit, and said output unit is located between said first planetary gear unit and said reduced speed rotation output means;
wherein said first clutch and said second clutch are located on the axial side of said first planetary gear unit opposite said one axial side;
wherein said engaging component is a third clutch that selectively connects said reduced speed rotary element and said first rotary component;
wherein said third clutch is located on the axial side of said speed reducing second planetary gear unit opposite said first planetary gear unit;
wherein said third clutch comprises a third hydraulic servo, friction members, a drum unit that is constructed integrally with said third hydraulic servo and opens toward said speed reducing second planetary gear unit, and a hub unit; and
wherein the third hydraulic servo is disposed on a boss extending from the case, and oil is supplied to said third hydraulic servo from an oil path in said boss.

8. An automatic transmission according to claim 7, wherein said engaging component engages in first speed forward.

9. An automatic transmission according to claim 7, wherein a transmitting member links (1) the reduced speed rotary element of said speed reducing second planetary gear unit or said engaging component and (2) the first rotary element of said first planetary gear unit, said transmitting member including an axially extending portion radially inward of said output unit.

10. An automatic transmission according to claim 7, wherein said first planetary gear unit is a multiple type planetary gear unit comprising a first sun gear, a long pinion which meshes with said first sun gear, a short pinion which meshes with said long pinion, a carrier for rotationally supporting said long pinion and said short pinion, a second sun gear meshing with said short pinion, and a ring gear meshing with said long pinion;

wherein said first rotary component is said second sun gear which receives the reduced speed rotation of said reduced speed rotation output means;

wherein said second rotary component is said first sun gear which receives input of rotation from said input shaft when said first clutch is engaged, and which is fixed against rotation by engagement of a first brake;

wherein said third rotary component is said carrier which receives input of rotation of said input shaft when said second clutch is engaged, and which is fixed against rotation by engagement of a second brake; and wherein said fourth rotary component is said ring gear linked to said output member.

11. An automatic transmission according to claim 10, wherein, in first speed forward, reduced speed rotation is input to said first rotary component from said reduced speed rotation output means, and said second brake is engaged;

wherein, in second speed forward, reduced speed rotation is input to said first rotary component from said reduced speed rotation output means, and said first brake is engaged;

wherein, in third speed forward, reduced speed rotation is input to said rotary component from said reduced speed rotaion output means, and said first clutch is engaged;

wherein, in fourth speed forward, reduced speed rotation is input to said first rotary component from said reduced speedrotation output means, and said second clutch is engaged;

wherein, in fifth speed forward, said first clutch and said second clutch are both engaged;

wherein, in sixth speed forward, said second clutch and said first brake are engaged; and wherein, in said one reverse speed, said first clutch and said second brake are engaged;

whereby said automatic transmission provides six forward speeds and one reverse speed.

12. An automatic transmission according to claim 7, wherein said first clutch is engaged in said one reverse speed.

13. An automatic transmission according to claim 12, wherein:

said first clutch is located adjoining said first planetary gear unit;

said first clutch comprises first friction members and a first hydraulic servo that causes said first friction members to engage and disengage, and a first drum unit and a first hub unit that are constructed integral with said first hydraulic servo;

said first drum unit is linked with said input shaft, and said first hub unit is linked with said second rotary component;

said second clutch is located on the axial side of said speed reducing second planetary gear unit opposite said first clutch;

said second clutch comprises second friction members, a second hydraulic servo that selectively engages said second friction members, and a second drum unit and a second hub unit that are constructed integral with said second hydraulic servo; and said second drum unit is linked with said input shaft, and said second hub unit is linked with said third rotary component.

14. An automatic transmission according to claim 13, further comprising:

a first brake for fixing said second rotary component against rotation;

a second brake for fixing said third rotary component against rotation;

wherein said first brake is located radially outward of said first clutch; and wherein said second brake is located radially outward of said first planetary gear unit.

15. An automatic transmission according to claim 14, wherein said first brake comprises friction members and a hydraulic servo;

wherein the hydraulic servo of said first brake is located radially outward of and at least partially axially overlapping said first hydraulic clutch; and wherein the friction members of said first brake are splined to the case and to the first hub unit.

16. An automatic transmission according to claim 15, wherein said second brake comprises friction members and a hydraulic servo;

wherein the hydraulic servo of said second brake is formed in a wall of the case extending radially inward and rotatably supporting said output member; and wherein the friction members of said second brake are located radially outward of said first planetary gear unit.

* * * * *

UNITED STATES PATENT AND TRADEMARK OFFICE
CERTIFICATE OF CORRECTION

| | | |
|---|---|---|
| PATENT NO. | : 7,226,380 B2 | Page 1 of 1 |
| APPLICATION NO. | : 10/519240 | |
| DATED | : June 5, 2007 | |
| INVENTOR(S) | : Kazumichi Kayama et al. | |

It is certified that error appears in the above-identified patent and that said Letters Patent is hereby corrected as shown below:

On the title page item (57)
In the Abstract:
    Line 6, "C3 connects" should read -- C3 which connects --.

In the Claims:
    Column 26, line 15 (claim 7, line 15), "said reducing" should read -- said speed reducing --.
    Column 27, line 29 (claim 11, line 10), "said rotary" should read -- said first rotary --;
        line 30, (claim 11, line 11), "rotaion" should read -- rotation --; and
        line 33 (claim 11, line 14), "speedrotation" should read -- speed rotation --.

Signed and Sealed this

Twentieth Day of November, 2007

JON W. DUDAS
*Director of the United States Patent and Trademark Office*